(12) United States Patent
Lim et al.

(10) Patent No.: US 11,598,687 B2
(45) Date of Patent: Mar. 7, 2023

(54) PRESSURE SENSOR, MANUFACTURING METHOD THEREOF, AND DISPLAY DEVICE HAVING THE SAME

(71) Applicants: Samsung Display Co., Ltd., Yongin-si (KR); Research & Business Foundation SUNGKYUNKWAN UNIVERSITY, Suwon-si (KR)

(72) Inventors: Jae Ik Lim, Yongin-si (KR); Won Sang Park, Yongin-si (KR); Hye Yong Chu, Yongin-si (KR); Do-Il Kim, Suwon-si (KR); Nae-Eung Lee, Seoul (KR); Han-Byeol Lee, Suwon-si (KR)

(73) Assignees: Samsung Display Co., Ltd.; RESEARCH & BUSINESS FOUNDATION SUNGKYUNKWAN UNIVERSITY

( * ) Notice: Subject to any disclaimer, the term of this patent is extended or adjusted under 35 U.S.C. 154(b) by 522 days.

(21) Appl. No.: 16/178,469

(22) Filed: Nov. 1, 2018

(65) Prior Publication Data

US 2019/0154533 A1    May 23, 2019

(30) Foreign Application Priority Data

Nov. 20, 2017  (KR) .................... 10-2017-0155067

(51) Int. Cl.
  *G01L 1/14*    (2006.01)
  *G01L 19/14*   (2006.01)
  *G01L 1/16*    (2006.01)

(52) U.S. Cl.
  CPC ............ *G01L 19/148* (2013.01); *G01L 1/148* (2013.01); *G01L 1/16* (2013.01)

(58) Field of Classification Search
  CPC ........................................................ G01L 1/16
  (Continued)

(56) References Cited

U.S. PATENT DOCUMENTS 8,544,337 B2   10/2013  Kuczynski et al.
8,877,085 B2   11/2014  Capsal et al.
(Continued)

FOREIGN PATENT DOCUMENTS

CN   102792476 A   11/2012
CN   102954848 A    3/2013
(Continued)

OTHER PUBLICATIONS

Sharma, Pankaj, et al. "Nanoscale domain patterns in ultrathin polymer ferroelectric films." Journal of Physics: Condensed Matter 21.48 (2009): 485902. (Year: 2009).*

(Continued)

*Primary Examiner* — Walter L Lindsay, Jr.
*Assistant Examiner* — Philipmarcus T Fadul
(74) *Attorney, Agent, or Firm* — Innovation Counsel LLP

(57) ABSTRACT

A pressure sensor includes: a base substrate including an embossed pattern; a first conductive layer disposed on the base substrate; a pressure sensitive material layer disposed on the first conductive layer such that its electrical characteristic is varied corresponding to a strain applied thereto, the pressure sensitive material layer including a dielectric and nanoparticles dispersed in the dielectric; and a second conductive layer disposed on the pressure sensitive material layer, wherein the dielectric and the nanoparticle include materials having pyroelectricities of polarities opposite to each other.

5 Claims, 15 Drawing Sheets

(58) Field of Classification Search
USPC .......................................................... 73/753
See application file for complete search history.

(56) References Cited

U.S. PATENT DOCUMENTS

| | | | |
|---|---|---|---|
| 10,036,675 B2 | 7/2018 | Tian | |
| 2006/0152113 A1* | 7/2006 | Nanataki | C01G 25/006 310/358 |
| 2015/0339001 A1* | 11/2015 | Zirkl | G06F 3/04166 345/177 |
| 2016/0211777 A1 | 7/2016 | Kim et al. | |
| 2017/0040306 A1* | 2/2017 | Kim | H05K 1/181 |
| 2018/0069167 A1* | 3/2018 | Cho | H01L 41/0477 |

FOREIGN PATENT DOCUMENTS

| | | |
|---|---|---|
| CN | 105115633 A | 12/2015 |
| CN | 105655480 A | 6/2016 |
| CN | 106802200 A | 6/2017 |
| CN | 106908176 A | 6/2017 |
| KR | 10-1578321 B1 | 12/2015 |
| KR | 10-2017-0092048 A | 8/2017 |

OTHER PUBLICATIONS

Chwee-Lin Choong et al., "Highly Stretchable Resistive Pressure Sensors Using a Conductive Elastomeric Composite on a Micropyramid Array", Advanced Materials, pp. 1-8 (Feb. 17, 2014).

C. Dagdviren et al., "Conformable amplified lead zirconate titanate sensors with enhanced piezoelectric response for cutaneous pressure monitoring", Nat. Commun., pp. 1-10 (Aug. 5, 2014).

N. T. Tien et al., "A Flexible Bimodal Sensor Array for Simultaneous Sensing of Pressure and Temperature", Adv. Mater. 2014, 26, pp. 796-804.

N. T. Tien et al., "Physically Responsive Field-Effect Transistors with Giant Electromechanical Coupling Induced by Nanocomposite Gate Dielectrics" ACS Nano (2011), vol. 5, No. 9, pp. 7069-7076.

Chinese Communication corresponding to Chinese Patent Application No. 201811375649.6 dated Jul. 26, 2021 10 pages.

\* cited by examiner

PRESSURE SENSOR, MANUFACTURING METHOD THEREOF, AND DISPLAY DEVICE HAVING THE SAME

CROSS-REFERENCE TO RELATED APPLICATION

The present application claims priority under 35 U.S.C. § 119(a) to Korean patent application 10-2017-0155067 filed on Nov. 20, 2017 in the Korean Intellectual Property Office, the entire disclosure of which is incorporated herein by reference.

BACKGROUND

1. Technical Field

An aspect of the present disclosure relates to a pressure sensor, a manufacturing method thereof, and a display device having the same.

2. Related Art

Pressure sensors are sensors for converting mechanical quantities such as a load, a weight, and a pressure into electrical signals, and are used in various fields such as vehicles, aircrafts, industrial processes, office automation, household electronic appliances, medical care, and environmental control.

Such a pressure sensor may include materials that generate electrical signals by means of physical forces. Since the materials included in the pressure sensor have both sensitivities to strain and temperature, it may be difficult to detect accurate information on pressure values in an environment in which changes in temperature and strain are made at the same time.

SUMMARY

Embodiments provide a pressure sensor capable of improving device characteristics, a method of manufacturing the pressure sensor, and a display having the pressure sensor.

According to an aspect of the present disclosure, there is provided a pressure sensor including: a base substrate including an embossed pattern; a first conductive layer disposed on the base substrate; a pressure sensitive material layer disposed on the first conductive layer such that its electrical characteristic is varied corresponding to a strain applied thereto, the pressure sensitive material layer including a dielectric and nanoparticles dispersed in the dielectric; and a second conductive layer disposed on the pressure sensitive material layer, wherein the dielectric and the nanoparticle include materials having pyroelectricities of polarities opposite to each other.

The dielectric may include a ferroelectric piezoelectric material having a positive (+) pyroelectricity, and the nanoparticle may include one of a barium titanate ($BaTiO_3$) nanoparticle, a lithium titanate ($BaTiO_3$) nanoparticle, a lead zirconate titanate (PZT) nanoparticle, a lead titanate ($PbTiO_3$) nanoparticle, and a $Pb_5Ge_3O_{11}$ nanoparticle, which has a negative (−) pyroelectricity.

In the pressure sensitive material layer, the nanoparticles may have a concentration of about 30 wt % to 40 wt %.

The embossed pattern may include: a plurality of protrusion parts protruding from a surface of the base substrate on which the first conductive layer is formed; and a valley provided between adjacent protrusion parts.

The pressure sensor may further include a plurality of dummy patterns provided at the peak of the protrusion part.

The first conductive layer may have a curved surface corresponding to the embossed pattern.

According to an aspect of the present disclosure, there is provided a method of manufacturing a pressure sensor, the method including: preparing a base substrate including an embossed pattern; forming a first conductive layer on the base substrate, wherein the first conductive layer has a curved surface corresponding to the embossed pattern; fixing the base substrate including the first conductive layer to an omnidirectional stretching device and then planarizing the curved surface of the first conductive layer by applying a tensile force to the base substrate in all directions; forming a pressure sensitive material layer on the first conductive layer having the planarized surface, wherein the pressure sensitive material includes a dielectric and nanoparticles dispersed in the dielectric; and forming a second conductive layer on the pressure sensitive material layer, where the dielectric and the nanoparticle include materials having pyroelectricities of polarities opposite to each other.

According to an aspect of the present disclosure, there is provided a display device including: a display panel configured to display an image; and a pressure sensor provided on one surface of the display panel, the pressure sensor sensing the pressure of a touch applied to the display panel, wherein the pressure sensor includes: a base substrate including an embossed pattern; a first conductive layer disposed on the base substrate; a pressure sensitive material layer disposed on the first conductive layer such that its electrical characteristic is varied corresponding to a strain applied thereto, the pressure sensitive material layer including a dielectric and nanoparticles dispersed in the dielectric; and a second conductive layer disposed on the pressure sensitive material layer, wherein the dielectric and the nanoparticle include materials having pyroelectricities of polarities opposite to each other.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
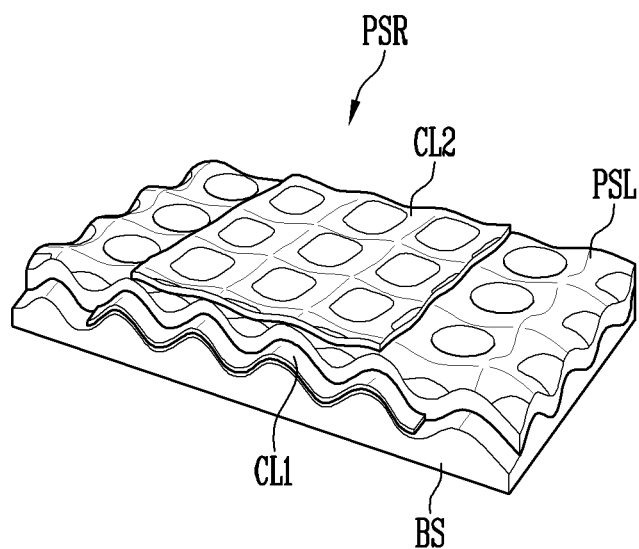
FIG. 1 is a perspective view illustrating a pressure sensor according to an embodiment of the present disclosure.

A detailed description of one or more embodiments of the present disclosure is provided below along with accompanying figures that illustrate the principles of the present disclosure. The present disclosure is described in connection with such embodiments, but the present disclosure is not limited to any embodiment. It is understood that various changes can be applied to the embodiments described herein. The embodiments illustrated herein are examples only. For example, different shapes can be used, the material described herein can change or equivalent material or replacement can be used. The drawings included are illustrated a fashion where the figures are expanded for the better understanding.

Like numbers refer to like elements throughout. In the drawings, the thickness of certain lines, layers, components, elements or features may be exaggerated for clarity. It will be understood that, although the terms "first", "second", etc. may be used herein to describe various elements, these elements should not be limited by these terms. These terms are only used to distinguish one element from another element. Thus, a "first" element discussed below could also be termed a "second" element without departing from the teachings of the present disclosure. As used herein, the singular forms are intended to include the plural forms as well, unless the context clearly indicates otherwise.

It will be further understood that the terms "includes" and/or "including", when used in this specification, specify the presence of stated features, integers, steps, operations, elements, and/or components, but do not preclude the presence and/or addition of one or more other features, integers, steps, operations, elements, components, and/or groups thereof. Further, an expression that an element such as a layer, region, substrate or plate is placed "on" or "above" another element indicates not only a case where the element is placed "directly on" or "just above" the other element but also a case where a further element is interposed between the element and the other element. On the contrary, an expression that an element such as a layer, region, substrate or plate is placed "beneath" or "below" another element indicates not only a case where the element is placed "directly beneath" or "just below" the other element but also a case where a further element is interposed between the element and the other element.

Hereinafter, exemplary embodiments of the present disclosure will be described in detail with reference to the accompanying drawings.

Figure 2:
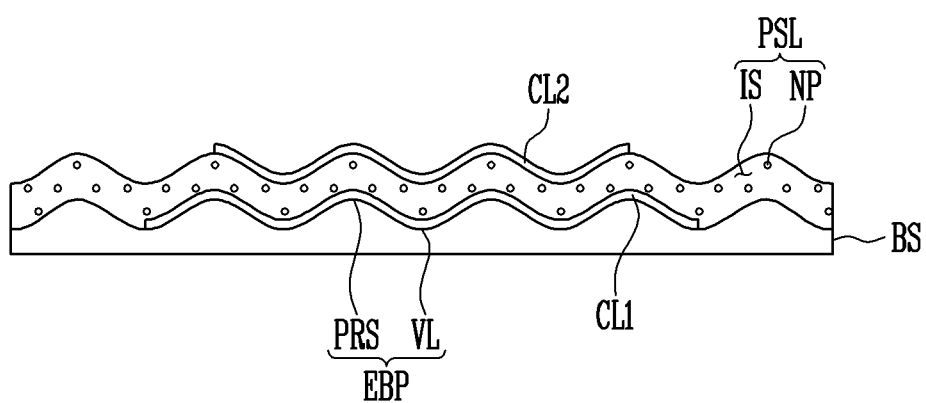
FIG. 2 is a sectional view schematically illustrating the pressure sensor of FIG. 1.
Figure 3A:
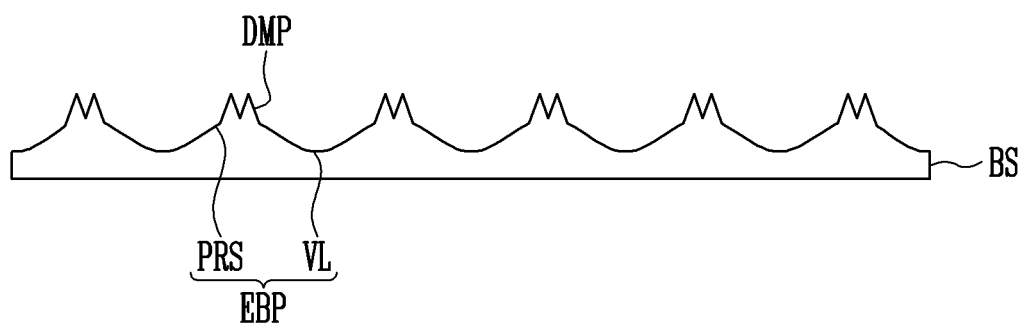
FIGS. 3A to 3C are sectional views illustrating other embodiments of a base substrate shown in FIG. 2.
Figure 3B:
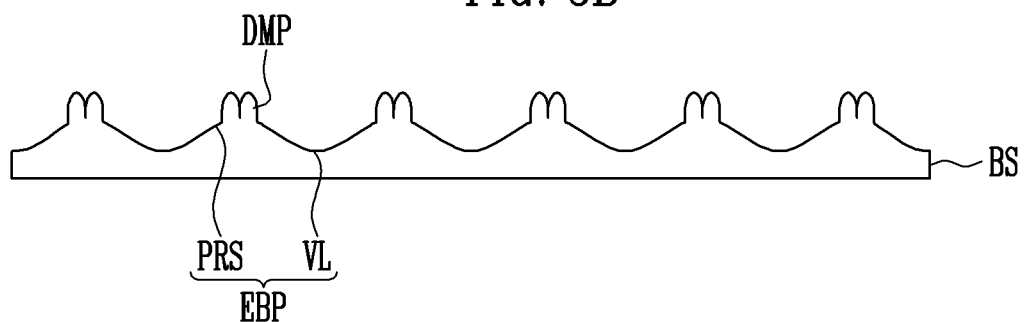
Figure 3C:
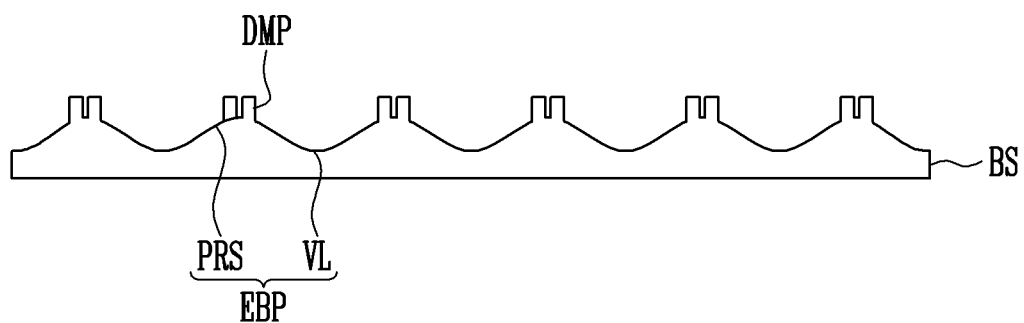
Figure 4:
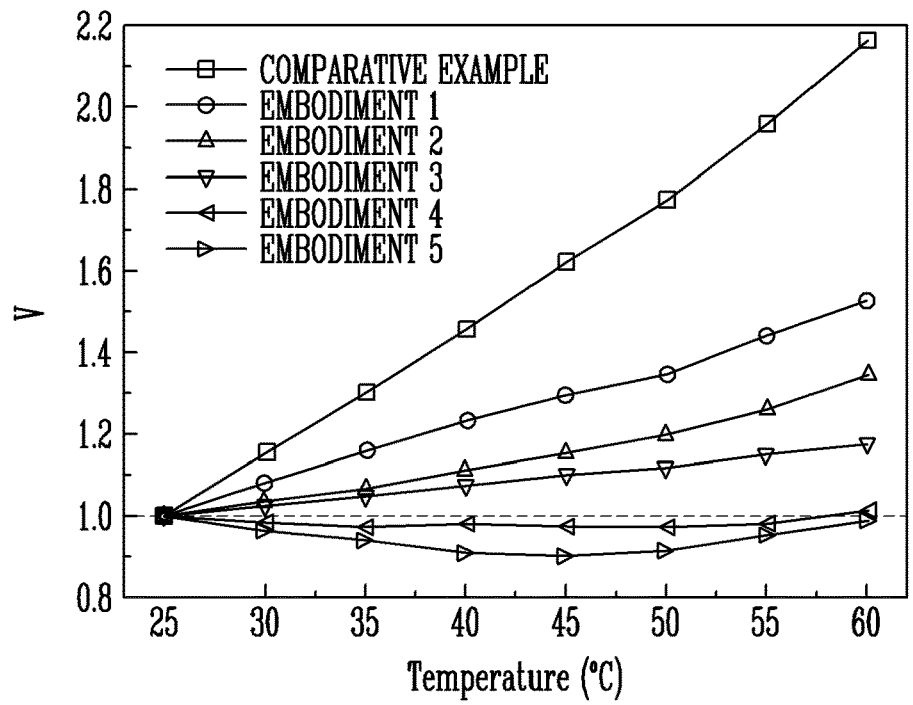
FIG. 4 is a graph illustrating changes in voltage of a pressure sensitive material layer with respect to changes in temperature.
Figure 5:
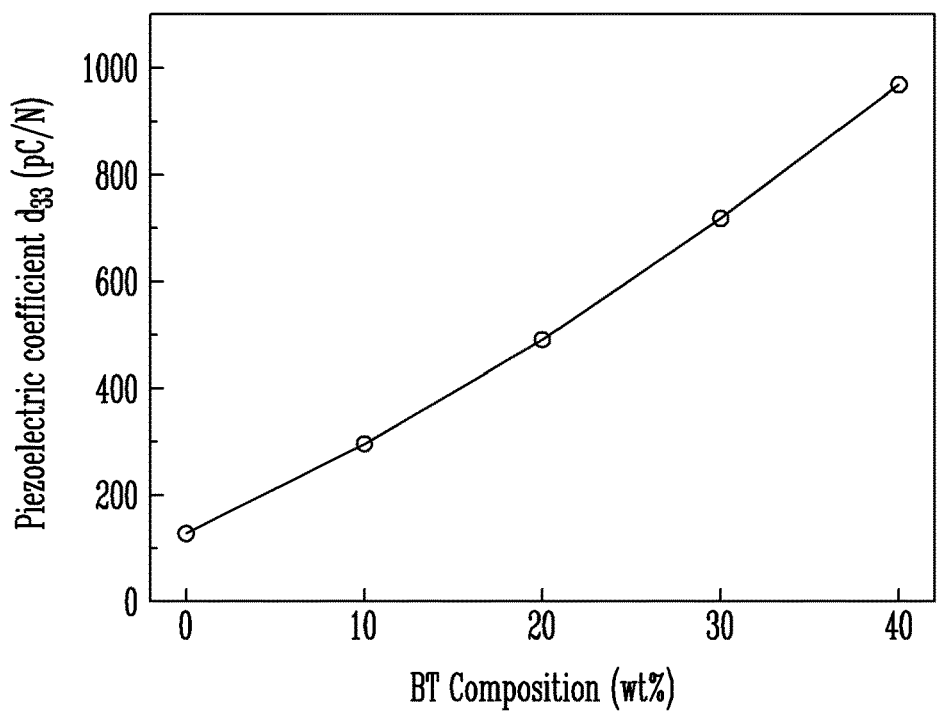
FIG. 5 is a graph illustrating changes in piezoelectric coefficient with respect to changes in concentration of barium titanate (BaTiO$_3$) nanoparticles.

FIG. 1 is a perspective view illustrating a pressure sensor according to an embodiment of the present disclosure. FIG. 2 is a sectional view schematically illustrating the pressure sensor of FIG. 1. FIGS. 3A to 3C are sectional views illustrating other embodiments of a base substrate shown in FIG. 2. FIG. 4 is a graph illustrating changes in voltage of a pressure sensitive material layer with respect to changes in temperature. FIG. 5 is a graph illustrating changes in piezoelectric coefficient with respect to changes in concentration of barium titanate (BaTiO$_3$) nanoparticles.

First, referring to FIGS. 1 and 2, the pressure sensor PSR according to the embodiment of the present disclosure may include a base substrate BS, a first conductive layer CL1, a pressure sensitive material layer PSL, and a second conductive layer CL2.

The base substrate BS may be made of a material having flexibility to be bendable or foldable, and have a single- or multi-layered structure.

For example, the material having the flexibility may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. In an embodiment of the present disclosure, the material constituting the base substrate BS may be formed using various material, including those listed above or other suitable materials.

Also, the base substrate BS may include a polymer material having excellent durability and thermal stability. For example, the polymer material may include polyurethane acrylate (PUA), polydimethylsiloxane (PDMS), a curable polymer material, and the like. In an embodiment of the present disclosure, when the PDMS is used as the base substrate BS, a mold-release film formed by evaporating a chlorotrimethylsilane (TMCS) solution may be provided on one surface of the base substrate BS.

In an embodiment of the present disclosure, the base substrate BS may include an embossed pattern EBP. The embossed pattern EBP may include a plurality of protrusion parts PRS protruding from one surface of the base substrate BS and a valley VL provided between adjacent protrusion parts PRS. In an embodiment of the present disclosure, the protrusion parts PRS in combination with the valley VL may form a curve having a predetermined curvature. In an embodiment of the present disclosure, the embossed pattern EBP may be a continuous curve in which the protrusion parts PRS and the valley VL are repeatedly arranged. For convenience, the peak of each protrusion part PRS is illustrated in a round shape, but the present disclosure is not limited thereto. In other embodiments, the protrusion part PRS can have other shapes.

In some embodiments, as shown in FIG. 3A, a plurality of dummy patterns DMP may be disposed at the peak of each protrusion part PRS so as to further improve the sensitivity of the pressure sensor PSR. The dummy patterns DMP may have a triangular shape, but the present disclosure is not limited thereto. For example, the dummy patterns DMP may have an elliptical shape as shown in FIG. 3B or have a quadrangular shape as shown in FIG. 3C.

The first conductive layer CL1 may be provided on the base substrate BS. The first conductive layer CL1 may include a conductive material. The conductive material may include metals or alloys thereof. The metals may include gold (Au), silver (Ag), aluminum (Al), molybdenum (Mo), chromium (Cr), titanium (Ti), nickel (Ni), neodymium (Nd), copper (Cu), platinum (Pt), and the like.

Also, the first conductive layer CL1 may include a transparent conductive material. The transparent conductive material may include silver nanowire (AgNW), indium tin oxide (ITO), indium zinc oxide (IZO), antimony zinc oxide (AZO), indium tin zinc oxide (ITZO), zinc oxide (ZnO), tin oxide (SnO2), carbon nano tube, graphene, and the like. The first conductive layer CL1 may be provided in a single layer or a multi-layer structure. For example, the first conductive layer CL1 may include a multi-layer structure in which two or more materials among the above-described materials are stacked.

The first conductive layer CL1 may have a shape in which its surface is not even but curved, e.g. a bumpy shape due to the embossed pattern EBP of the base substrate BS. That is, the first conductive layer CL1 may have a curved surface. If the embossed pattern EBP of the base substrate BS includes the dummy patterns DMP, the first conductive layer CL1 may have a surface corresponding thereto.

The second conductive layer CL2 may be provided on the pressure sensitive material layer PSL. The second conductive layer CL2 may be made of the same material as the first conductive layer CL1 or be made of a material different from that of the first conductive layer CL1.

The pressure sensitive material layer PSL is a component having an electrical characteristic that is changed depending on a deformed degree thereof, and the electrical characteristic of the pressure sensitive material layer PSL may be changed depending on a strain applied from the outside between the first conductive layer CL1 and the second conductive layer CL2. For example, the pressure sensitive material layer PSL may have an output voltage that is changed depending on a strain applied thereto.

In an embodiment of the present disclosure, the pressure sensitive material layer PSL may include a dielectric IS and nanoparticles NP dispersed in the dielectric IS.

In an embodiment of the present disclosure, the dielectric IS may include a piezoelectric material from which an electric field is generated by a mechanical deformation. For example, the piezoelectric material P(VDF-TrFE), PVDF, P(VDF-TrFE-CFE), PZT, PTO, BTO, BFO, $KNbO_3$, $NaNbO_3$, GeTe, ZnO, $ZnSnO_3$, GaN, and the like. In an embodiment of the present disclosure, the dielectric IS may include P(VDF-TrFE) having ferroelectricity. The P(VDF-TrFE) having ferroelectricity may have a positive (+) pyroelectricity. Here, the pyroelectricity may refer to a property that an electric field is generated according to a change in temperature.

The nanoparticles NP are uniformly dispersed in the dielectric IS, and may include any one of a barium titanate ($BaTiO_3$) nanoparticle, a lithium titanate ($BaTiO_3$) nanoparticle, a lead zirconate titanate (PZT) nanoparticle, a lead titanate ($PbTiO_3$) nanoparticle, and a $Pb_5Ge_3O_{11}$ nanoparticle. In an embodiment of the present disclosure, the nanoparticle NP may include the barium titanate ($BaTiO_3$) nanoparticle. The barium titanate ($BaTiO_3$) nanoparticle may have a negative (−) pyroelectricity. In the pressure sensitive material layer PSL, the barium titanate ($BaTiO_3$) nanoparticle may have a concentration of about 30 wt % to 40 wt %.

As described above, the dielectric IS and the nanoparticle NP may have pyroelectricities of polarities opposite to each other. Therefore, the final pyroelectricity of the pressure sensitive material layer PSL may be controlled according to a composition ratio of the dielectric IS and the nanoparticle NP. For example, when the concentration of the barium titanate ($BaTiO_3$) nanoparticle having the negative (−) pyroelectricity is increased, the pressure sensitive material layer PSL may have a low pyroelectricity. That the pressure sensitive material layer PSL has a low pyroelectricity may mean that the electrical characteristic of the pressure sensitive material layer PSL is not influenced by temperature.

The pressure sensitive material layer PSL may have a shape in which its surface is curved due to embossed pattern EBP of the base substrate BS. Therefore, the surface of the second conductive layer CL2 disposed on the top of the pressure sensitive material layer PSL may also have a curved shape.

As described above, each of the first conductive layer CL1, the pressure sensitive material layer PSL, and the second conductive layer CL2, which are provided on the top of the base substrate BS, may have a curved surface due to the embossed pattern EBP of the base substrate BS. The degree to which the pressure sensor PSR including the components is deformed by a stain applied from the outside is increased, so that the sensitivity of the pressure sensor PSR can be improved.

Further, as each of the first conductive layer CL1, the pressure sensitive material layer PSL, and the second conductive layer CL2 has a curved surface, a stress applied to the pressure sensor PSR is absorbed when the pressure sensor PSR is stretched in all directions, so that the deformation of the pressure sensor PSR, caused by the stress, can be minimized. Accordingly, the flexibility of the pressure sensor PSR can be improved.

Hereinafter, changes in voltage with respect to changes in temperature of the pressure sensitive material layer PSL will be described with reference to FIG. 4.

In FIG. 4, Comparative Example illustrates a case where only the dielectric IS is included in the pressure sensitive material layer PSL, Embodiment 1 illustrates a case where the barium titanate ($BaTiO_3$) nanoparticle having a concentration of about 5 wt % is included in the pressure sensitive material layer PSL, and Embodiment 2 illustrates a case where the barium titanate ($BaTiO_3$) nanoparticle having a concentration of about 10 wt % is included in the pressure sensitive material layer PSL. In addition, Embodiment 3 illustrates a case where the barium titanate ($BaTiO_3$) nanoparticle having a concentration of about 20 wt % is included in the pressure sensitive material layer PSL, Embodiment 4 illustrates a case where the barium titanate ($BaTiO_3$) nanoparticle having a concentration of about 30 wt % is included in the pressure sensitive material layer PSL, and Embodiment 5 illustrates a case where the barium titanate ($BaTiO_3$) nanoparticle having a concentration of about 40 wt % is included in the pressure sensitive material layer PSL.

Also, in FIG. 4, numbers indicated on the X axis of the graph represent temperatures (° C.) of an external environment to which the pressure sensitive material layer PSL of Comparative Example and the pressure sensitive material layers PSL corresponding to the respective embodiments are applied. Numbers indicated on the Y axis of the graph represent output voltage values (V) of the pressure sensitive material layer PSL of Comparative Example and the pressure sensitive material layers PSL corresponding to the respective embodiments.

The output voltage value (V) of the pressure sensitive material layer PSL of Comparative Example increases as the temperature of the external environment increases. The output voltage values (V) of the pressure sensitive material layer PSL of Embodiment 1, the pressure sensitive material layer PSL of Embodiment 2, and the pressure sensitive material layer PSL of Embodiment 3 also increase as the temperature of the external environment increases. However, it can be seen that the degree to which the output voltage value (V) of the pressure sensitive material layer PSL of each of Embodiments 1, 2, and 3 is changed depending on a change in temperature of the external environment is smaller than the rate of change in output voltage value (V) of the pressure sensitive material layer PSL of Comparative Example.

Although the temperature of the external environment increases, each of the pressure sensitive material layer PSL of Embodiment 4 and the pressure sensitive material layer PSL of Embodiment 5 has a small change in output voltage value (V). It can be seen that each of the pressure sensitive material layer PSL of Embodiment 4 and the pressure sensitive material layer PSL of Embodiment 5 outputs a constant voltage value (V) regardless of the temperature of the external environment. That is, it can be seen that, when the barium titanate ($BaTiO_3$) nanoparticle included in the pressure sensitive material layer PSL has a concentration of about 30 wt % (corresponding to Embodiment 4) or has a concentration of about 40 wt % (corresponding to Embodiment 5), the pressure sensitive material layer PSL has a constant voltage value (V) regardless of a change in temperature. In other words, it can be seen that, when the barium titanate ($BaTiO_3$) nanoparticle has a concentration of about 30 wt % (corresponding to Embodiment 4) in the pressure sensitive material layer PSL or has a concentration of about 40 wt % (corresponding to Embodiment 5) in the pressure sensitive material layer PSL, the pressure sensitive material layer PSL of each of Embodiment 4 and Embodiment 5 has a very low pyroelectricity.

Consequently, in the embodiment of the present disclosure, the pyroelectricity of the pressure sensitive material layer PSL is controlled by adjusting the concentration (wt %) of the barium titanate ($BaTiO_3$) nanoparticle, so that it is possible to construct the pressure sensor of the present disclosure that is independent of temperature variations, that is, the pressure sensor electrical characteristic does not vary with variations in the temperature of the pressure sensor.

Hereinafter, changes in piezoelectric coefficient with respect to changes in concentration of the barium titanate ($BaTiO_3$) nanoparticle in the pressure sensitive material layer PSL will be described with reference to FIG. 5.

In FIG. 5, numbers indicated on the X axis of the graph represent concentrates (wt %) of the barium titanate ($BaTiO_3$) nanoparticle in the pressure sensitive material layer PSL according to the embodiment of the present disclosure. Numbers indicated on the Y axis of the graph represent piezoelectric coefficients with respect to the concentrates (wt %) of the barium titanate ($BaTiO_3$) nanoparticle, which are indicated on the X axis.

As can be seen in FIG. 5, the piezoelectric coefficient of the pressure sensitive material layer PSL increases as the concentrate (wt %) of the barium titanate ($BaTiO_3$) nanoparticle in the pressure sensitive material layer PSL increases. In particular, it can be seen that, when the concentration of the barium titanate ($BaTiO_3$) nanoparticle in the pressure sensitive material layer PSL is 30 wt % to 40 wt %, the piezoelectric coefficient of the pressure sensitive material layer PLS increases.

Consequently, according to the embodiment of the present disclosure, the pressure sensor PSR having improved pressure sensitivity can be implemented using piezoelectric characteristics of the barium titanate ($BaTiO_3$) nanoparticle having a concentration of about 30 wt % to 40 wt % in the pressure sensitivity material layer.

In some embodiments, the pressure sensitive material layer PSL may be provided in a fiber, so that the pressure sensitivity of the pressure sensor PSR can be further improved.

FIGS. 6 to 11 are perspective views sequentially illustrating a manufacturing method of the pressure sensor of FIG. 1.

Figure 6:
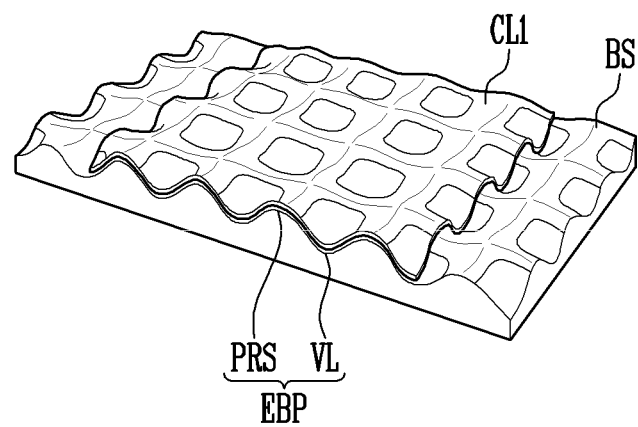
FIGS. 6 to 11 are perspective views sequentially illustrating a manufacturing method of the pressure sensor of FIG. 1.

Referring to FIGS. 1 and 6, a first conductive layer CL1 is formed on a base substrate BS including an embossed pattern EBP.

The base substrate BS may be formed by coating a polymer material having flexibility on a mold (not shown) including a fine pattern and then curing the polymer material such that the embossed pattern EBP is included in one surface thereof. Here, the fine pattern may refer to a pattern having a reverse image with respect to the embossed pattern EBP. The embossed pattern EBP may include a plurality of protrusion parts PRS and a valley VL provided between adjacent protrusion parts PRS.

The first conductive layer CL1 may be formed by depositing a conductive material on the base substrate BS including the embossed pattern EBP, using thermal evaporation or electron-beam evaporation. The first conductive layer CL1 may have a shape in which its surface is curved by the embossed pattern EBP of the base substrate BS.

Subsequently, referring to FIGS. 1 and 7, after the base substrate BS having the first conductive layer CL1 formed thereon is fixed to an omnidirectional stretching device (see 10 of FIG. 12, which will be described later), the base substrate BS is stretched in all directions by providing a tensile force to the base substrate BS in all directions (i.e., the directions of the arrows shown in FIG. 7).

In this case, the embossed pattern EBP of the base substrate BS may be planarized. If the embossed pattern EBP is planarized, the shape of the protrusion parts PRS and the shape of the valley VL may become gentle. Therefore, the top surface of the embossed pattern EBP may be provided as a curve having a gentle slope. The curved surface of the first conductive layer CL1 may become gentle due to the planarized embossed pattern EBP.

The planarization of the base substrate BS including the embossed pattern EBP and the first conductive layer CL1 formed on the top of the base substrate BS is for the purpose of allowing a pressure sensitive material (see PSL' of FIG. 8) which will be described later to have a uniform thickness. This will be described in detail with reference to FIG. 8.

Figure 8:
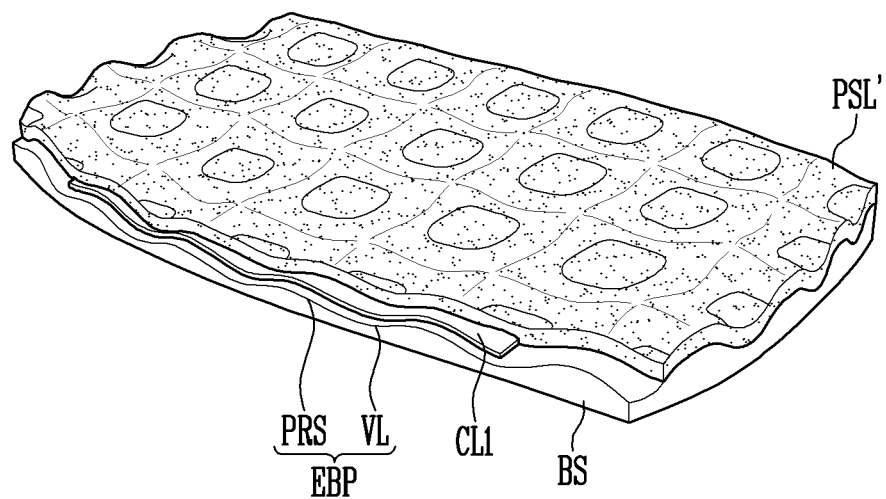

Referring to FIGS. 1 and 8, the pressure sensitive material PSL' is formed on the base substrate BS including the planarized first conductive layer CL1. The pressure sensitive material PSL' may include a dielectric (see IS of FIG. 2) and barium titanate ($BaTiO_3$) nanoparticles (see NP of FIG. 2) dispersed in the dielectric IS.

The pressure sensitive material PSL' may be formed on the first conductive layer CL1, using spin coating. At this time, the first conductive layer CL1 may correspond to the top surface of the embossed pattern EBP having the gentle slope to have a shape in which its surface is gently curved. When the pressure sensitive material PSL' is formed on the first conductive layer CL1 having the shape in which its surface is gently curved, the pressure sensitive material PSL' can have a uniform thickness throughout the entire area of the base substrate BS.

If when the pressure sensitive material PSL' is formed on the first conductive layer CL1 without planarizing the embossed pattern EBP and the first conductive layer CL1, the thickness of a portion of the pressure sensitive material PSL', which corresponds to the valley VL of the embossed pattern EBP may be different from that of portions of the pressure sensitive material PSL', which correspond to the protrusion parts PRS of the embossed pattern EBP. When the pressure sensor is configured to include the pressure sensitive material PSL' having different thicknesses in different areas, a leakage current may be generated.

Accordingly, in the embodiment of the present disclosure, the base substrate BS including the embossed pattern EBP and the first conductive layer CL1 are planarized such that the pressure sensitive material PSL' has a uniform thickness.

Figure 9:
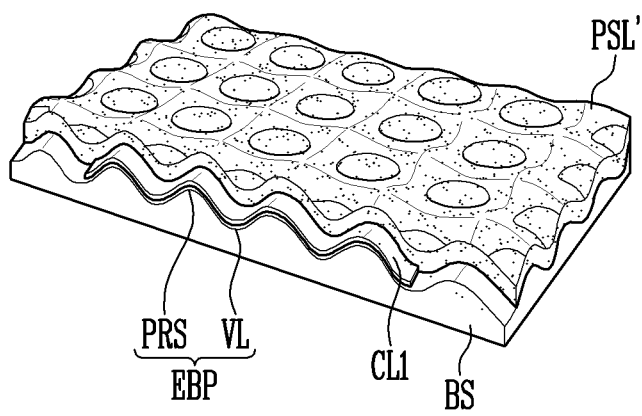

Referring to FIG. 9, as the base substrate BS having the pressure sensitive material PSL' formed thereon is separated from the omnidirectional stretching device (see 10 of FIG. 12), the omnidirectional tensile force provided to the base substrate BS is removed. Therefore, the base substrate BS may be returned to the original state. That is, the embossed pattern EBP of the base substrate BS and the first conductive layer CL1 may be returned to have the original shapes.

Figure 10:
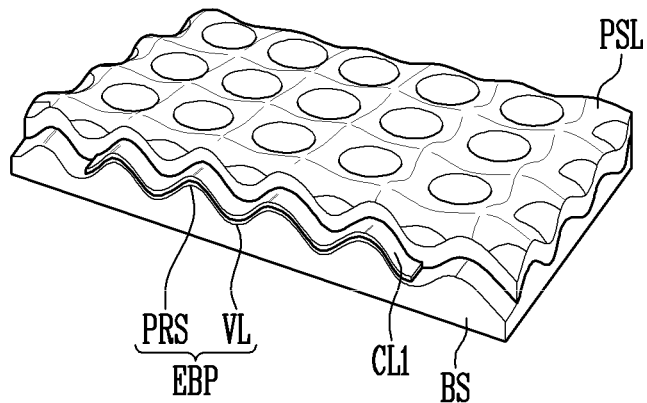

Referring to FIG. 10, as the pressure sensitive material PSL' is crystallized by heat-treating the base substrate BS, which has been returned to the original state, at 140° C. for about 4 hours, a pressure sensitive material layer PSL is finally formed. Here, the pressure sensitive material layer PSL may have a shape in which its surface is curved by the embossed pattern EBP of the base substrate BS.

The dielectric IS of the crystallized pressure sensitive material layer PSL may have a positive (+) pyroelectricity, and the nanoparticle NP of the pressure sensitive material layer PSL may have a negative (−) pyroelectricity. That is, the dielectric IS and the nanoparticle NP in the pressure sensitive material layer PSL may have pyroelectricities of polarities opposite to each other. Therefore, the final pyroelectricity of the pressure sensitive material layer PSL may be controlled according to a composition ratio of the dielectric IS and the nanoparticle NP.

Figure 11:
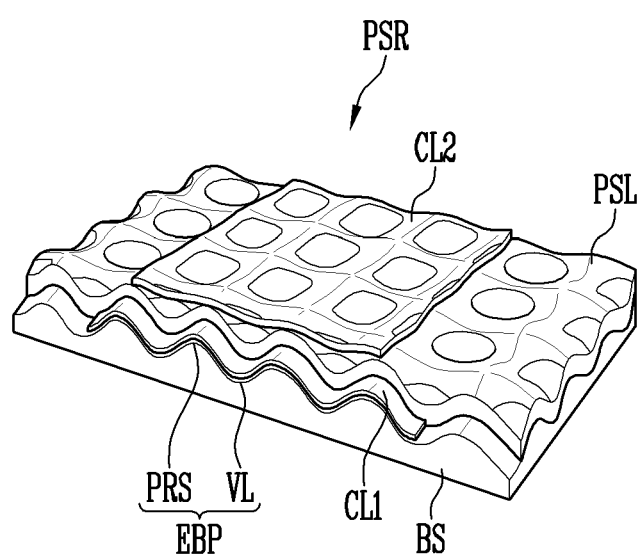

Subsequently, referring to FIG. 11, a second conductive layer CL2 is formed on the crystallized pressure sensitive material layer PSL. The second conductive layer CL2 may be formed by depositing a conductive material on the pressure sensitive material layer PSL, using thermal evaporation or electron-beam evaporation. The second conductive layer CL2 may correspond to the curved shape of the pressure sensitive material layer PSL such that its surface is curved.

Figure 7:
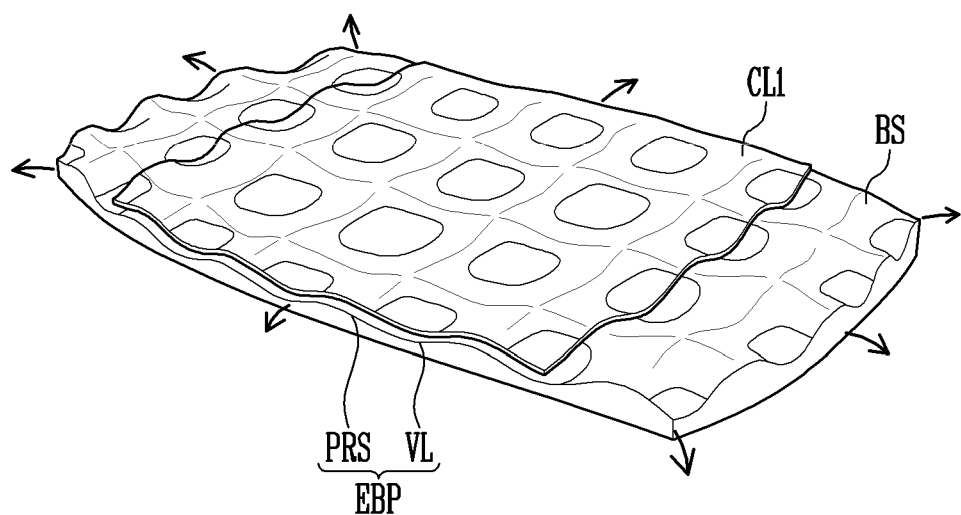
Figure 12:
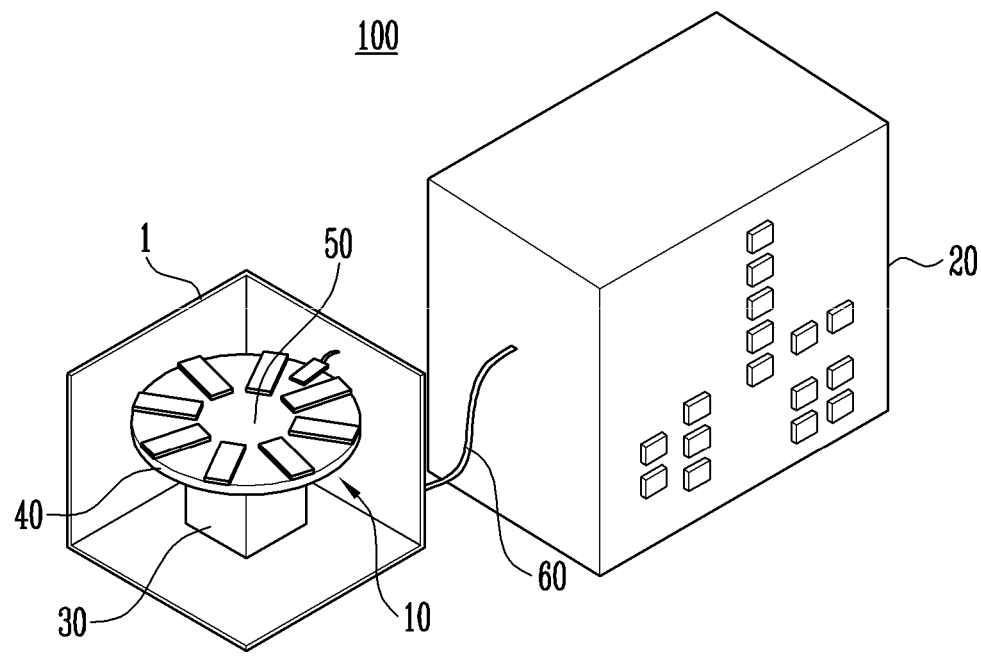
FIG. 12 is a view schematically illustrating a stretching electricity measurement apparatus used in a manufacturing method of planarizing the base substrate of FIG. 7.
Figure 13A:
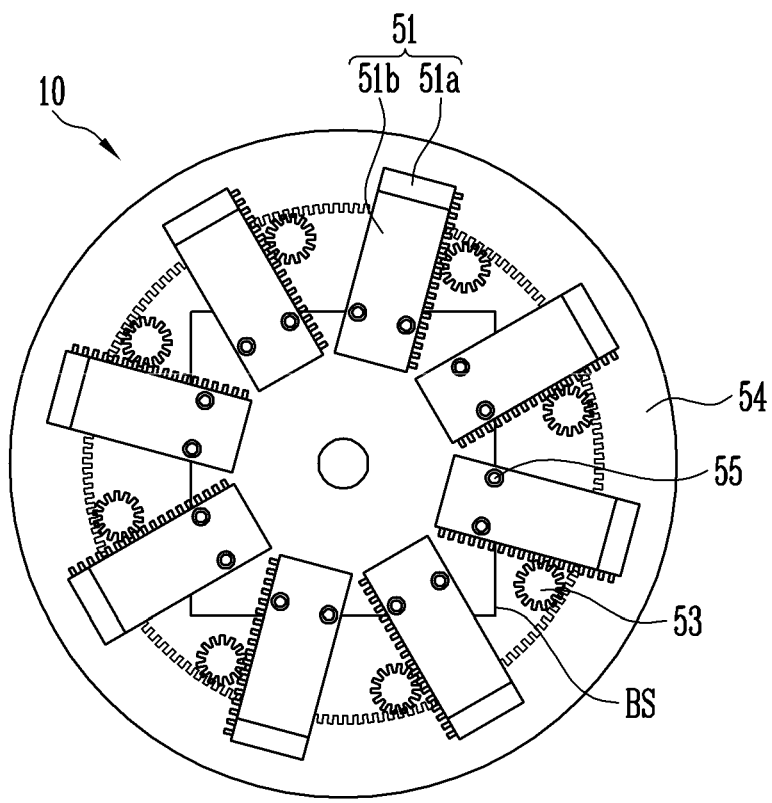
FIG. 13A is a view illustrating a state in which the base substrate is mounted on an omnidirectional stretching device of FIG. 12.
Figure 13B:
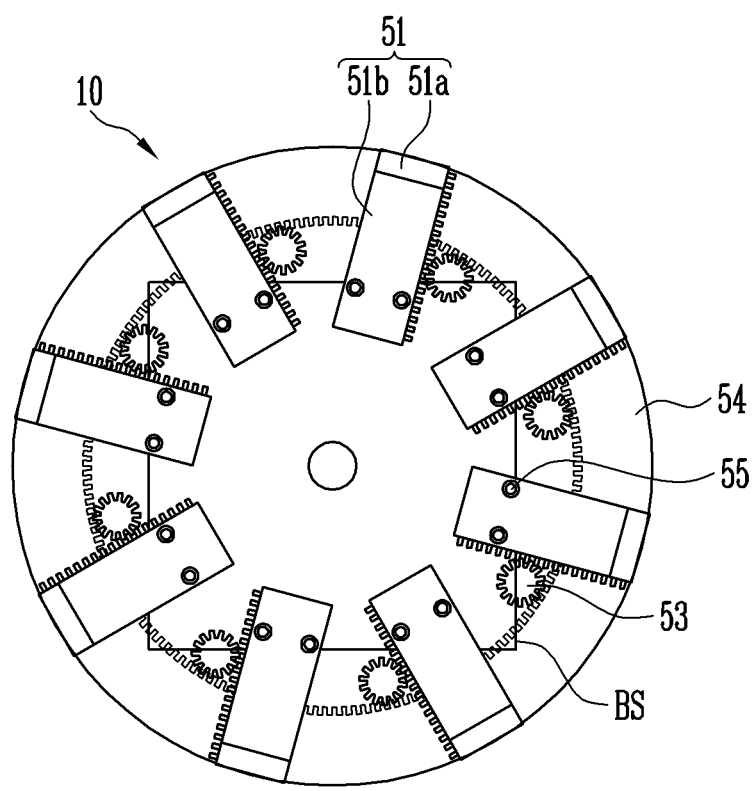
FIG. 13B is a view illustrating a state in which a tensile force is applied in all directions to the base substrate of FIG. 13A.

FIG. 12 is a view schematically illustrating a stretching electricity measurement apparatus used in a manufacturing method of planarizing the base substrate of FIG. 7. FIG. 13A is a view illustrating a state in which the base substrate is mounted on an omnidirectional stretching device of FIG. 12. FIG. 13B is a view illustrating a state in which a tensile force is applied in all directions to the base substrate of FIG. 13A.

Referring to FIGS. 7, 12, 13A, and 13B, the stretching electricity measurement apparatus 100 includes an omnidirectional stretching device 10 located in a chamber 1 and an electricity measurement system 20.

The chamber 1 may be made of a metallic material so as to minimize unnecessary environmental contaminations from the outside. A motor 30 for driving the omnidirectional stretching device 10 and a supporting part 40 for supporting the omnidirectional stretching device 10 may be provided in the chamber 1.

The electricity measurement system 20 may be electrically connected to the omnidirectional stretching device 10 through a cable 60 for transmitting/receiving electrical signals to control driving of the omnidirectional stretching device 10.

The omnidirectional stretching device 10 may include a mounting part 50 for allowing a base substrate BS to be mounted thereon, a fastening part 51 for fixing the base substrate BS, and a gear 53 and a shaft 54, which are configured to stretch the base substrate BS in all directions. Here, the base substrate BS may include an embossed pattern EBR The fastening part 51 may include a first fastening part 51a disposed on the bottom of the base substrate BS and a second fastening part 51b disposed on the top of the base substrate BS. After the base substrate BS is inserted between the first fastening part 51a and the second fastening part 51b, the base substrate BS may be fixed to the fastening part 51 through a fixing screw 55. In an embodiment of the present disclosure, the fastening part 51 may be provided in plural numbers so as to stretch the base substrate BS in all directions. For example, eight fastening parts 51 may be provided, but the present disclosure is not limited thereto.

The fastening part 51 may have a rectangular shape including a pair of lateral parts and a pair of longitudinal parts. In this case, one of the pair of longitudinal parts of the fastening part 51 may have a sawtooth shape. This is for the purpose of allowing the fastening part 51 to perform a rotatory motion while being engaged with the gear 53.

The gear 53 may be provided in a number corresponding to that of the fastening parts 51. The gear 53 may be fastened to the fastening part 51 and the shaft 54, to be rotated as the shaft 54 performs a rotatory motion.

The shaft 54 is a component that allows the plurality of fastening parts 51 to be simultaneously moved, and may have a sawtooth shape to be engaged with the gear 53. If the shaft 54 is rotated, the gear 53 is rotated by the sawtooth shape of the shaft 54, and therefore, the plurality of fastening parts 51 may be moved toward the outside as shown in FIG. 13B. In this case, the base substrate BS fixed to the fastening parts 51 may be stretched in all directions.

When the base substrate BS is stretched in all directions by using the above-described omnidirectional stretching device 10, the top surface of the embossed pattern EBP of the base substrate BS may be provided as a curve having a gentle slope. Each of the structures coated on the base substrate BS, e.g., the first conductive layer CL1 and pressure sensitive material PSL' can have a uniform thickness.

Hereinafter, temperature sensitivity characteristics of a pressure sensor according to an embodiment of the present disclosure will be described with reference to FIGS. 14A, 14B, 15A, and 15B.

Figure 14A:
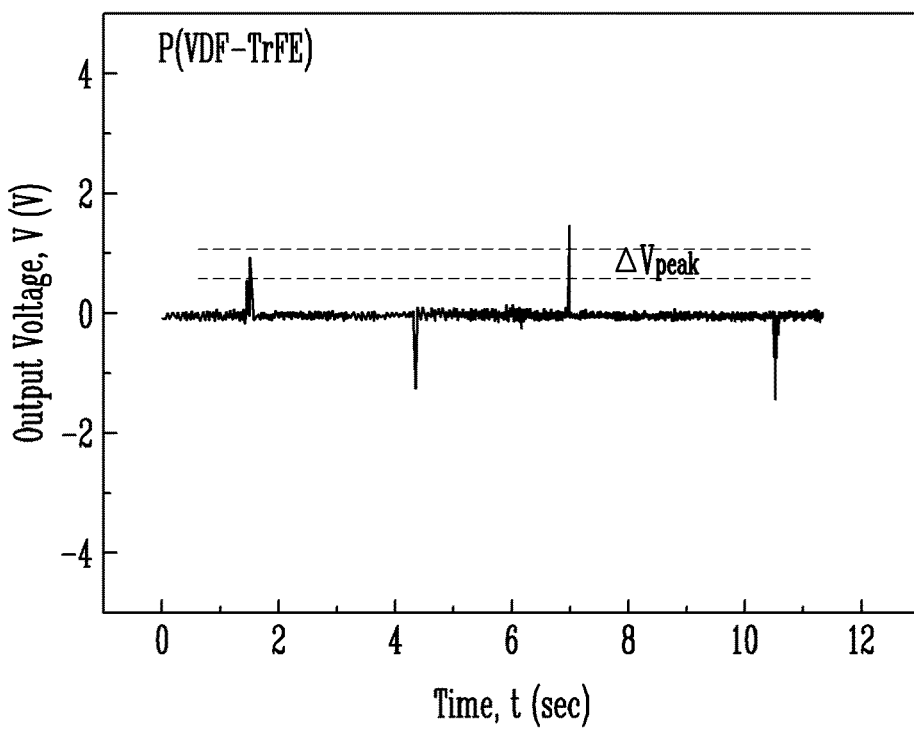
FIG. 14A is a graph illustrating changes in voltage when a heated object is dropped onto a pressure sensor including only a ferroelectric piezoelectric material (P(VDF-TrFE)) and when a non-heated object is dropped onto the pressure sensor.
Figure 14B:
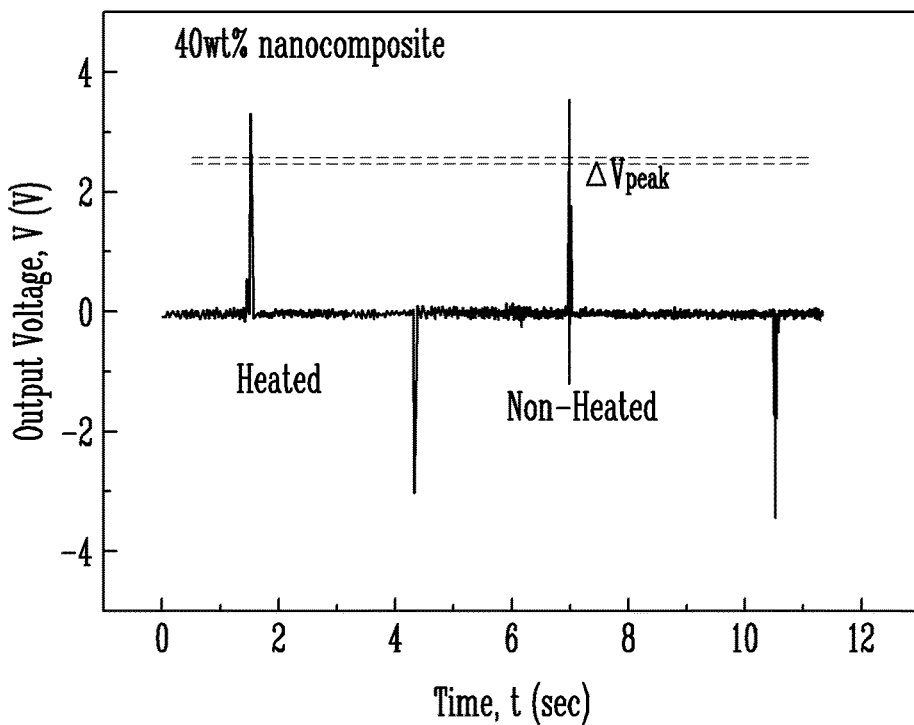
FIG. 14B is a graph illustrating changes in voltage when a heated object is dropped onto a pressure sensor according to an embodiment of the present disclosure and when a non-heated object is dropped onto the pressure sensor.
Figure 15A:
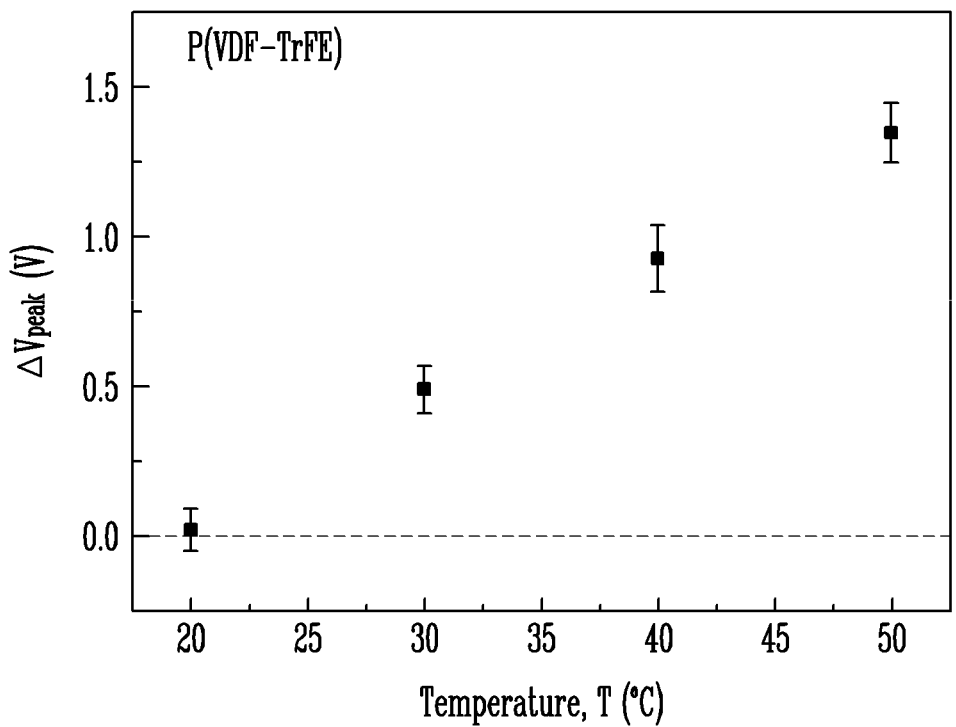
FIG. 15A is a graph obtained by plotting ΔVpeak values of FIG. 14A.
Figure 15B:
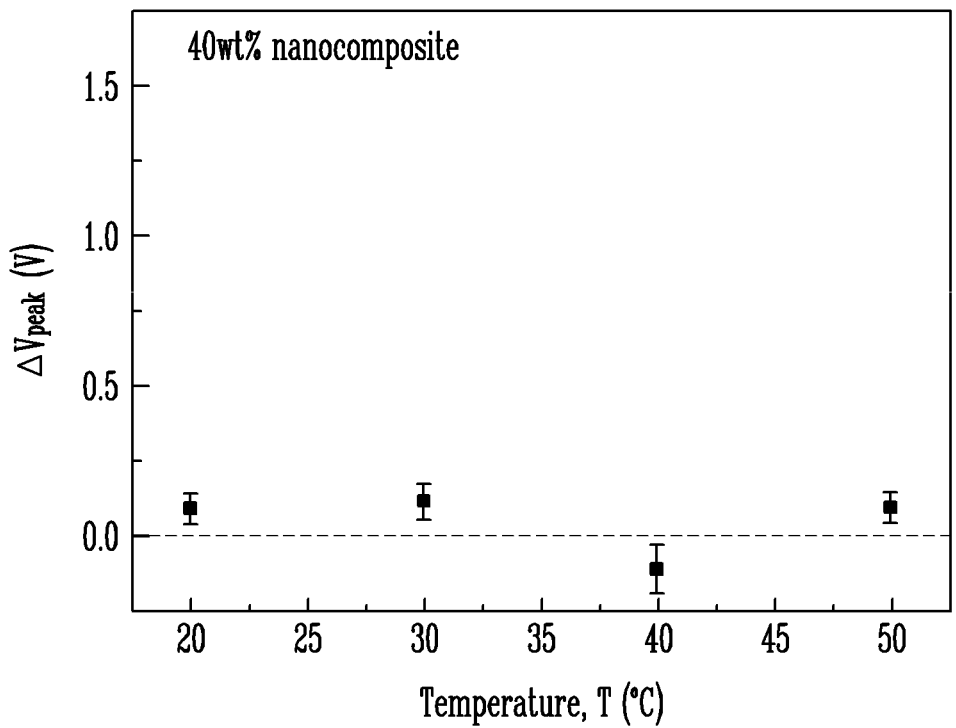
FIG. 15B is a graph obtained by plotting ΔVpeak values of FIG. 14B.

FIG. 14A is a graph illustrating changes in voltage when a heated object is dropped onto a pressure sensor including only a ferroelectric piezoelectric material (P(VDF-TrFE)) and when a non-heated object is dropped onto the pressure sensor. FIG. 14B is a graph illustrating changes in voltage when a heated object is dropped onto a pressure sensor according to an embodiment of the present disclosure and when a non-heated object is dropped onto the pressure sensor. FIG. 15A is a graph obtained by plotting ΔVpeak values of FIG. 14A. FIG. 15B is a graph obtained by plotting ΔVpeak values of FIG. 14B.

In FIG. 14B, the pressure sensor according to the embodiment of the present disclosure may include a dielectric made of a ferroelectric piezoelectric material (P(VDF-TrFE)) and a pressure sensitive material layer including barium titanate ($BaTiO_3$) nanoparticles dispersed in the dielectric. Here, the barium titanate ($BaTiO_3$) nanoparticles in the pressure sensitive material layer may have a concentration of 40 wt %.

For convenience of description, a pressure sensor including only a ferroelectric piezoelectric material (P(VDF-TrFE)) is referred to as a comparative example, and a pressure sensor including the barium titanate ($BaTiO_3$) nanoparticles having the concentration of 40 wt % is referred to as an embodiment.

Referring to FIGS. 14A, 14B, 15A, and 15B, it can be seen that the difference (ΔVpeak) between output voltage values when a heated object is dropped onto the pressure sensor of the comparative example and when a non-heated object is dropped onto the pressure sensor of the comparative example is higher than that (ΔVpeak) between output voltage values when the heated object is dropped onto the pressure sensor of the embodiment and when the non-heated object is dropped onto the pressure sensor of the embodiment.

Specifically, it can be seen that the output voltage value when the non-heated object is dropped onto the pressure sensor of the comparative example is larger than that when the heated object is dropped onto the pressure sensor of the comparative example. On the other hand, it can be seen that the output voltage value when the non-heated object is dropped onto the pressure sensor of the embodiment is hardly different from that when the heated object is dropped onto the pressure sensor of the embodiment. Accordingly, it can be seen that the pressure sensor of the comparative example is more sensitive to a change in temperature than the pressure sensor of the embodiment of the present disclosure. That is, it can be seen that the pressure sensor of the embodiment outputs a constant voltage value without being influenced by a change in temperature due to a very low pyroelectricity of the barium titanate ($BaTiO_3$) nanoparticles having the concentration of 40 wt %.

Numbers indicated on the X axis of the graph of each of FIGS. 15A and 15B represent temperatures of the heated object dropped onto each of the pressure sensors of the comparative example and the embodiment. In addition, numbers indicated on the Y axis of the graph of each of FIGS. 15A and 15B represent differences (ΔVpeak) between output voltage values when the heated object is dropped onto each of the pressure sensors of the comparative example and the embodiment and when the non-heated object is dropped onto each of the pressure sensors of the comparative example and the embodiment.

It can be seen that the difference (ΔVpeak) between output voltage values when the heated object is dropped onto the pressure sensor of the comparative example and when the non-heated object is dropped onto the pressure sensor of the comparative example increases as the temperature of the heated object increases. In addition, it can be seen that, although the temperature of the heated object increases, the difference (ΔVpeak) between output voltage values when the heated object is dropped onto the pressure sensor of the embodiment and when the non-heated object is dropped onto the pressure sensor of the embodiment is maintained at a constant level. Accordingly, it can be seen that the pressure sensor of the comparative example is influenced by temperature and the pressure sensor of the embodiment of the present disclosure is not influenced by temperature.

Hereinafter, pressure sensing characteristics and sensitivity characteristics of a pressure sensor according to an embodiment of the present disclosure will be described with reference to FIGS. 16A and 16B.

Figure 16A:
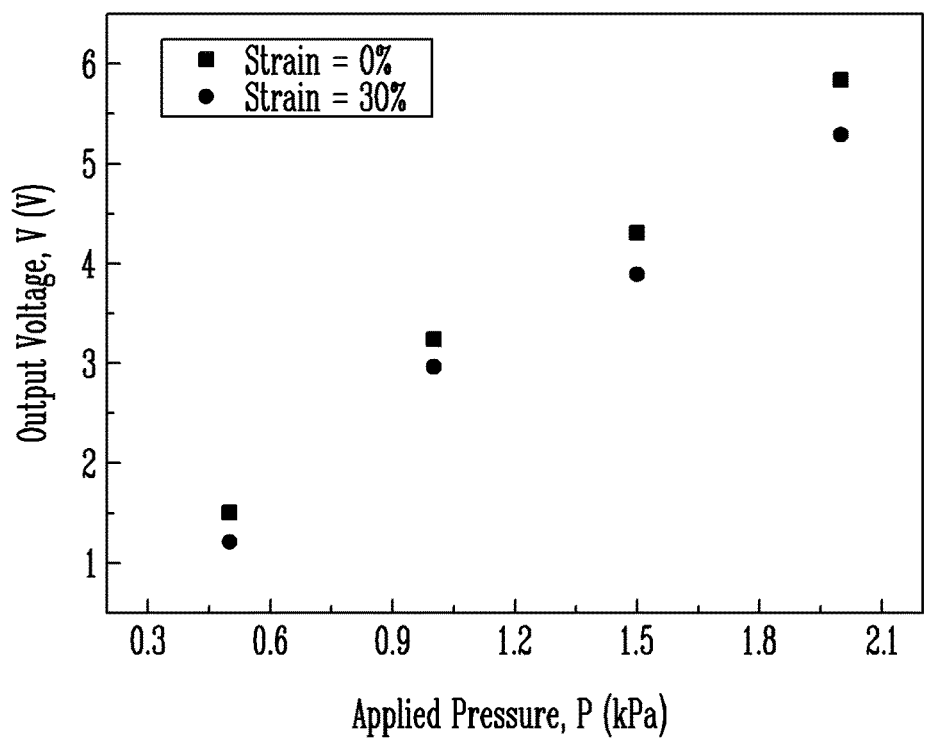
FIG. 16A is a graph illustrating changes in voltage of a pressure sensor according to an embodiment of the present disclosure before and after a tensile force is applied in all directions to the pressure sensor.

FIG. 16A is a graph illustrating changes in voltage of a pressure sensor according to an embodiment of the present disclosure before and after a tensile force is applied in all directions to the pressure sensor. FIG. 16B is a graph obtained by measuring sensitivities with respect to tensile strains of a pressure sensor according to an embodiment of the present disclosure.

In FIG. 16A, numbers indicated on the X axis of the graph represent magnitudes of pressures applied when the pressure sensor according to the embodiment of the present disclosure is not stretched in all directions (strain=0%) (hereinafter, referred to as a 'first example embodiment') and when the pressure sensor according to the embodiment of the present disclosure is stretched by 30% in all directions (strain=30%) (hereinafter, referred to as a 'second example embodiment'). In addition, numbers indicated on the Y axis of the graph represent output voltage values (V) of each of the first and second example embodiments of the present disclosure.

As can be seen in FIG. 16A, the first example embodiment and the second example embodiment output voltage values (V) almost similar to each other due to pressure applied from the outside. Accordingly, it can be seen that, although the pressure sensor according to the embodiment of the present disclosure is stretched in all directions, the pressure sensor according to the second example embodiment of the present disclosure has pressure sensitivity characteristics almost similar to those of the pressure sensor of the first example embodiment.

Figure 16B:
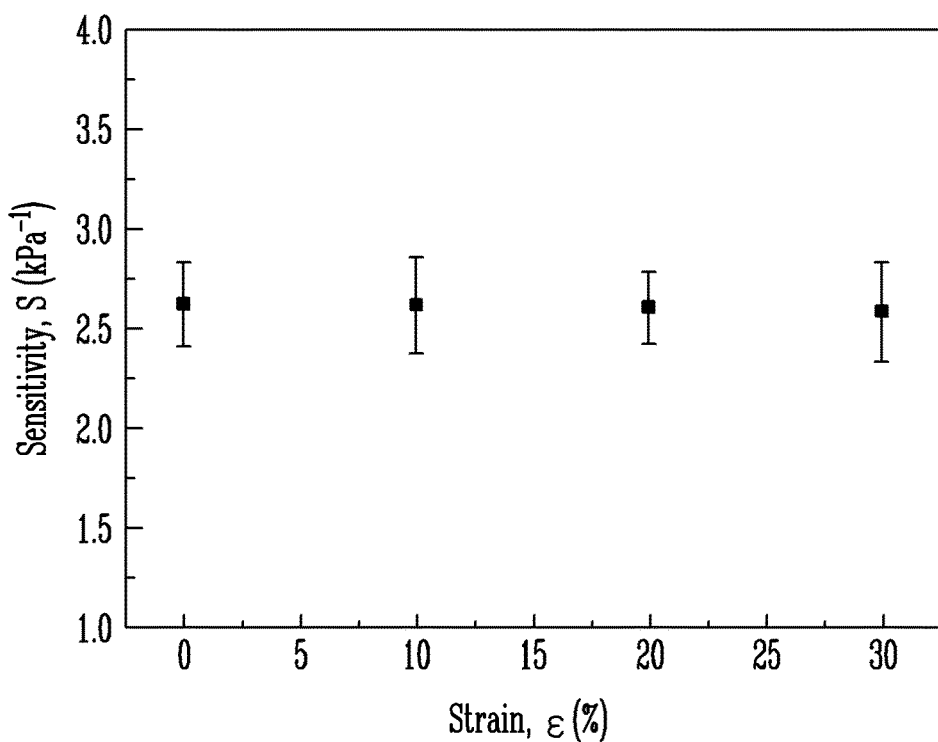
FIG. 16B is a graph obtained by measuring sensitivities with respect to tensile strains of a pressure sensor according to an embodiment of the present disclosure.

In FIG. 16B, numbers indicated on the X axis of the graph represent degrees to which the pressure sensor according to the present disclosure is stretched in all directions, and numbers indicated on the Y axis of the graph represent pressure sensitivities of the pressure sensor according to the present disclosure.

As can be seen in FIG. 16B, the pressure sensitivity when the pressure sensor according to the embodiment of the present disclosure is stretched by about 10% in all directions is almost similar to that when the pressure sensor is not stretched. In addition, the pressure sensitivity when the pressure sensor according to the embodiment of the present disclosure is stretched by about 20% in all directions is almost similar to that when the pressure sensor is not stretched. In addition, the pressure sensitivity when the pressure sensor according to the embodiment of the present disclosure is stretched by about 30% in all directions is almost similar to that when the pressure sensor is not stretched. Accordingly, it can be seen that, although the pressure sensor according to the embodiment of the present disclosure is stretched in all directions, the pressure sensor according to the embodiment of the present disclosure has a pressure sensitivity almost similar to that when the pressure sensor is not stretched.

Hereinafter, pressure sensing characteristics of a pressure sensor including a base substrate having an embossed pattern according to an embodiment of the present disclosure will be described with reference to FIGS. 17A and 17B.

Figure 17A:
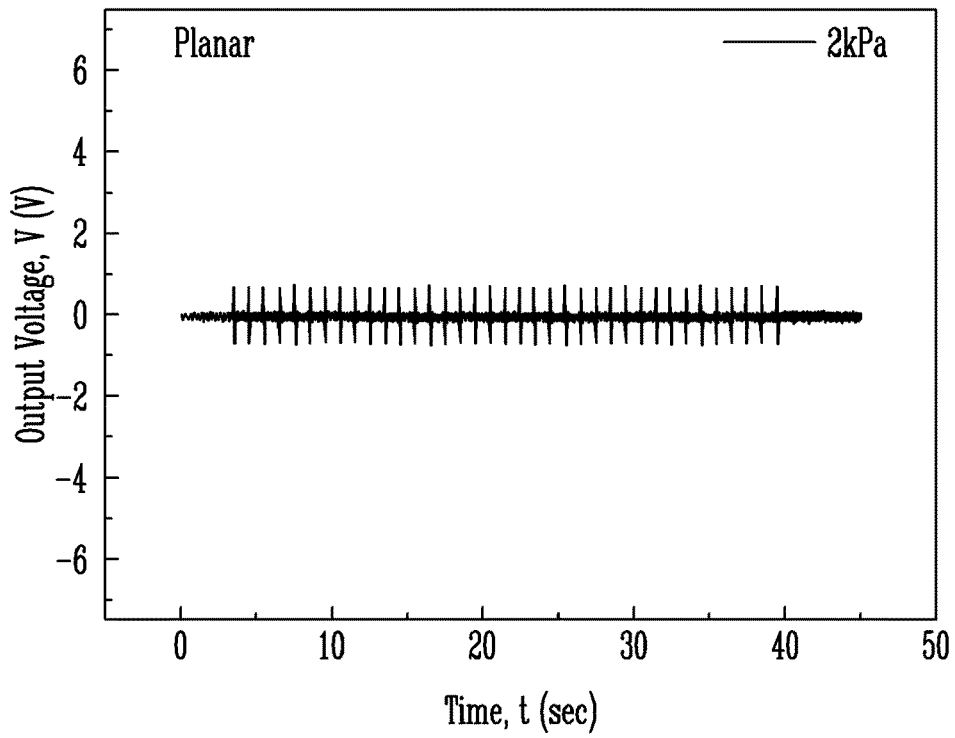
FIG. 17A is a graph illustrating changes in voltage of a conventional pressure sensor including a substrate having a flat surface with respect to changes in time.

FIG. 17A is a graph illustrating changes in voltage of a conventional pressure sensor including a substrate having a flat surface with respect to changes in time. FIG. 17B is a graph illustrating changes in voltage of a pressure sensor according to an embodiment of the present disclosure with respect to changes in time.

In FIG. 17A, the X axis of the graph represents times for which a strain is applied to the conventional pressure sensor, and the Y axis of the graph represents output voltage values (V) when the strain is applied to the conventional pressure sensor. Also, in FIG. 17B, the X axis of the graph represents times for which a strain is applied to the pressure sensor according to the embodiment of the present disclosure, and the Y axis of the graph represents output voltage values (V) when the strain is applied to the pressure sensor according to the embodiment of the present disclosure.

Figure 17B:
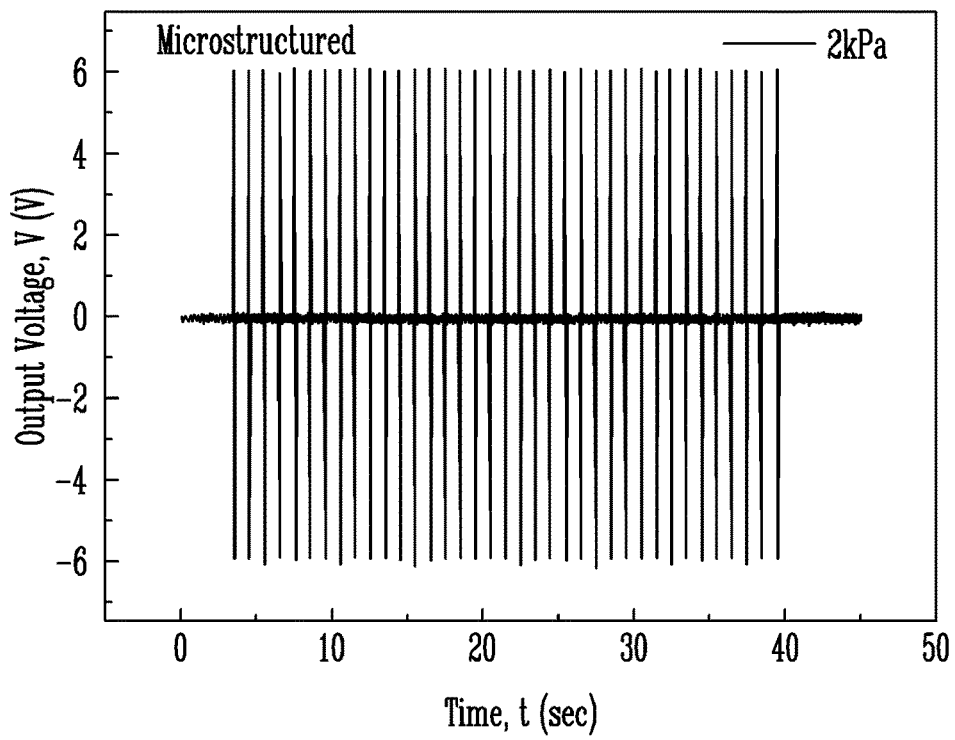
FIG. 17B is a graph illustrating changes in voltage of a pressure sensor according to an embodiment of the present disclosure with respect to changes in time.

As can be seen in FIGS. 17A and 17B, when a strain is applied to the pressure sensor according to the embodiment of the present disclosure, the pressure sensor according to the embodiment of the present disclosure exhibits a pressure sensing characteristic that is about ten times higher than that of the conventional pressure sensor. Accordingly, it can be seen that the pressure sensor including the base substrate (see BS of FIG. 2) having the embossed pattern (see EBP of FIG. 2) according to the embodiment of the present disclosure has a sensitivity higher than that of the conventional pressure sensor having a flat surface.

According to the embodiment described above, when the pressure sensor is implemented to include the base substrate BS having the embossed pattern EBP, the sensitivity of the pressure sensor can be improved.

Further, according to the embodiment described above, when the pressure sensor is implemented to include a dielectric (see IS of FIG. 2) and a pressure sensitive material layer (see PSL of FIG. 2) including barium titanate ($BaTiO_3$) nanoparticles dispersed in the dielectric IS, the pressure sensing characteristic of the pressure sensor is not influenced by temperature. That is, according to the embodiment described above, the pressure sensor that is not sensitive to temperature variations can be implemented.

The pressure sensor according to the embodiment of the present disclosure can be employed in display devices to be used as various electronic devices.

Figure 18:
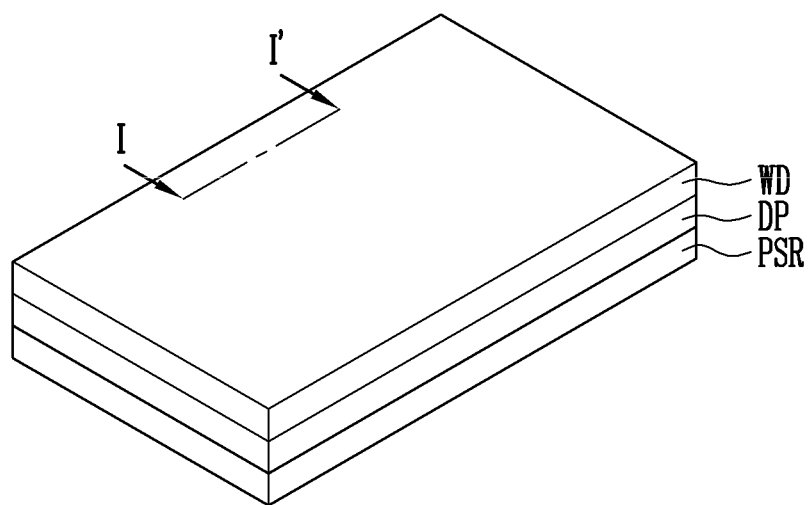
FIG. 18 is a perspective view of a display device employing the pressure sensor of FIG. 1.
Figure 19:
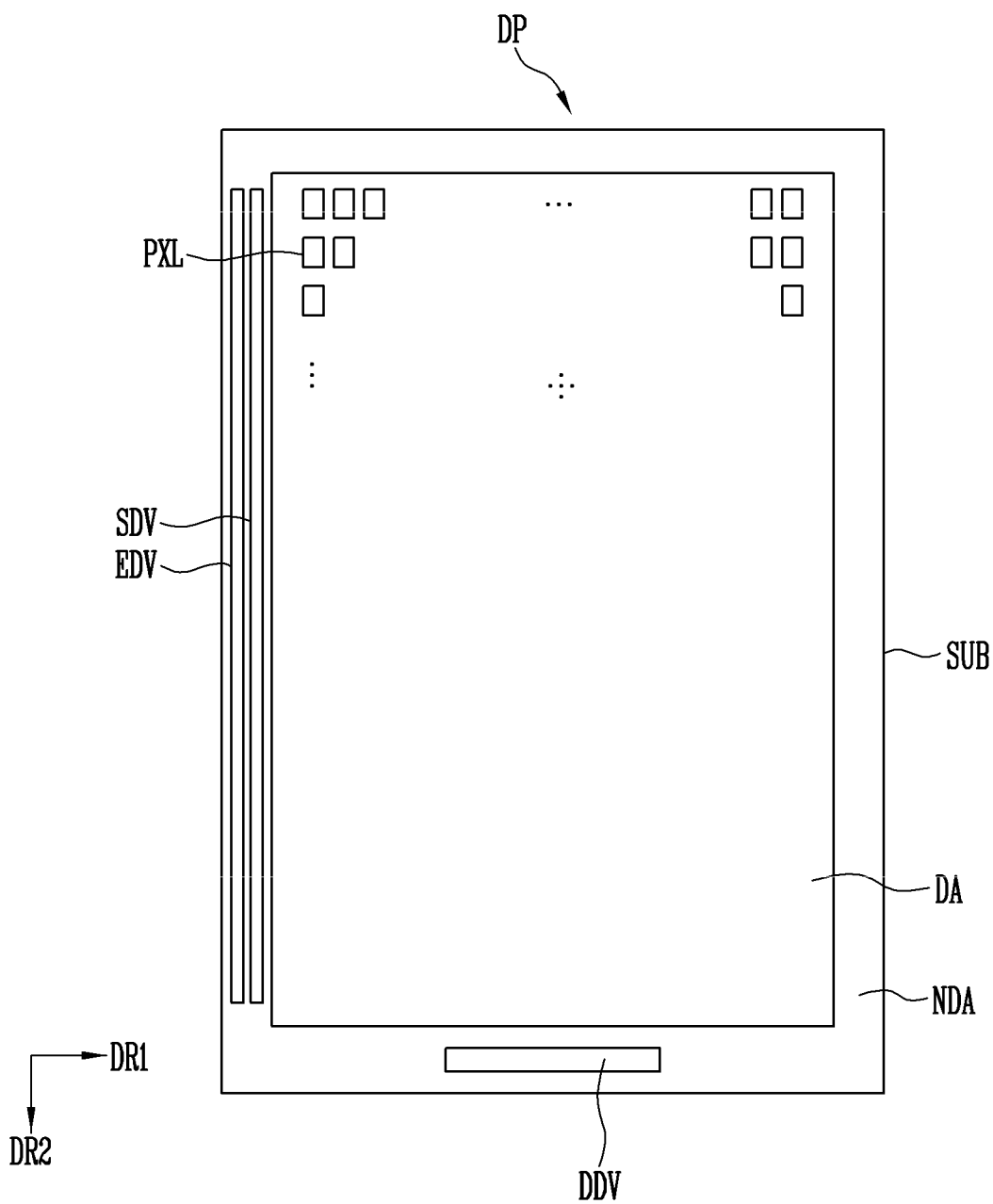
FIG. 19 is a plan view schematically illustrating a display panel of FIG. 18.

FIG. 18 is a perspective view of a display device employing the pressure sensor of FIG. 1, and FIG. 19 is a plan view schematically illustrating a display panel of FIG. 18.

Referring to FIGS. 1, 18, and 19, the display device according to the embodiment of the present disclosure may be provided in various shapes. For example, the display device may be provided in a rectangular plate shape having two pairs of sides parallel to each other. When the display device is provided in the rectangular plate shape, any one pair of sides among the two pairs of sides may be provided longer than the other pair of sides.

The display device may include a pressure sensor PSR, a display panel DP, and a window WD.

The display panel DP may be used to display arbitrary visual information, e.g., a text, a video, a picture, a two-dimensional or three-dimensional image, etc. In an embodiment of the present disclosure, the display panel DP may be an organic light emitting display panel (OLED panel).

The display panel DP may have various shapes. For example, the display panel DP may be provided in various shapes such as a closed polygon including linear sides, a circle, an ellipse, etc., including curved sides, and a semicircle, a semi-ellipse, etc., including linear and curved sides. In an embodiment of the present disclosure, the display panel DP may have a shape corresponding to that of the display device.

The display panel DP may include a substrate SUB including a display region DA and a non-display region NDA.

The display panel DP may be provided with a first base substrate SUB including the display region DA and the non-display region NDA. Here, the display region DA may be located at a central portion of the display panel DP and have an area relatively larger than that of the non-display region NDA. The display region DA may have various shapes. For example, the display region DA may be provided in various shapes such as a closed polygon including linear sides, a circle, an ellipse, etc., including curved sides, and a semicircle, a semi-ellipse, etc., including linear and curved sides. When the display region DA includes a plurality of regions, each region may also be provided in various shapes such as a closed polygon including linear sides, a circle, an ellipse, etc., including curved sides, and a semicircle, a semi-ellipse, etc., including linear and curved sides. In addition, the plurality of regions may have areas equal to or different from one another. In an embodiment of the present disclosure, a case where the display region DA is provided as one region having a quadrangular shape including linear sides is described as an example.

The non-display region NDA may be provided on at least one side of the display region DA. In an embodiment of the present disclosure, the non-display region NDA may include a lateral part extending in a first direction DR1 and a longitudinal part extending in a second direction DR2 intersecting the first direction DR1.

A plurality of pixels PXL may be provided in the display region DA. Each pixel PXL is a minimum unit for displaying an image, and the pixel PXL may be provided in plural numbers in the display region DA. In an embodiment of the present disclosure, the pixel PXL may include an organic light emitting device. The pixel PXL may emit light of one color among red, green, blue, and white, but the present disclosure is not limited thereto. For example, the pixel PXL may emit light of one color among cyan, magenta, yellow, and the like.

A driving unit for driving the pixels PXL, a power supply unit (not shown) for providing power to each pixel PXL, and a portion of a line unit (not shown) for connecting the pixels PXL and the driving unit may be provided in the non-display region NDA.

The driving unit provides a signal to each pixel PXL through the line unit, and accordingly, can control driving of each pixel PXL.

The driving unit may include a scan driver SDV for providing a scan signal to each pixel PXL through a scan line, an emission driver EDV for providing an emission control signal to each pixel PXL through an emission control line, a data driver DDV for providing a data signal to each pixel PXL through a data line, and a timing controller (not shown). The timing controller may control the scan driver SDV, the emission driver EDV, and the data driver DDV.

The power supply unit may include at least one power line. For example, the power supply unit may include a first power line (not shown) and a second power line (not shown). The power supply unit may supply power to each of the pixels PXL arranged in the display region DA.

Figure 20:
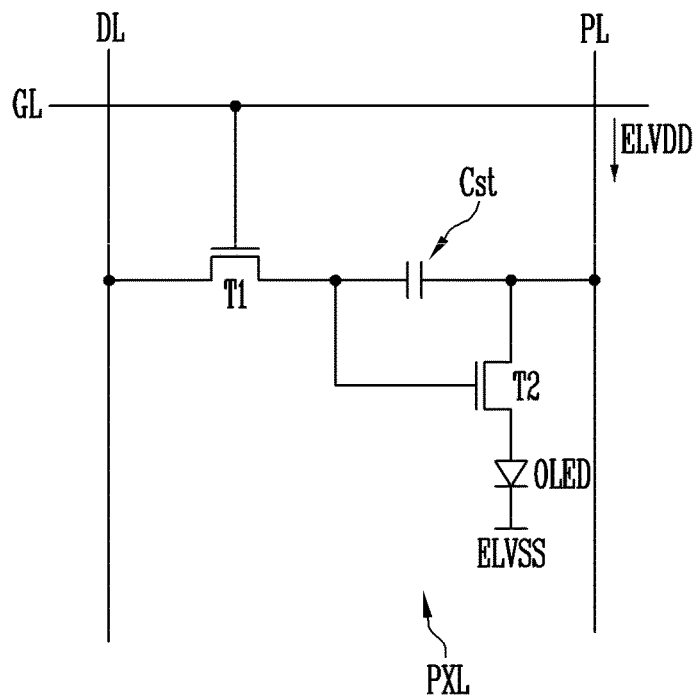
FIG. 20 is an equivalent circuit diagram illustrating a pixel among pixels shown in FIG. 19.

FIG. 20 is an equivalent circuit diagram illustrating a pixel among the pixels shown in FIG. 19. For convenience of description, a pixel and lines connected to the pixel are mainly illustrated.

Referring to FIGS. 19 and 20, each pixel PXL may include a transistor connected to lines, a light emitting device OLED connected to the transistor, and a capacitor Cst. The light emitting device OLED may be a top-emission organic light emitting device or a bottom-emission organic light emitting device. The organic light emitting device may be an organic light emitting diode.

Each pixel PXL is a pixel driving circuit for driving the light emitting device OLED, and may include a first transistor (or switching transistor) T1, a second transistor (or driving transistor) T2, and the capacitor Cst. A first power source ELVDD may be provided to the second transistor T2 through a power line PL, and a second power source ELVSS may be provided to the light emitting device OLED. The second power source ELVSS may be set to a voltage lower than that of the first power source ELVDD.

The first transistor T1 outputs a data signal applied to a data line DL in response to a scan signal applied to a gate line GL. The capacitor Cst charges a voltage corresponding to the data signal received from the first transistor T1. The second transistor T2 is connected to the light emitting device OLED. The second transistor T2 controls a driving current flowing through the light emitting device OLED, corresponding to a quantity of charges stored in the capacitor Cst.

In an embodiment of the present disclosure, it is illustrated that one pixel PXL includes two transistors T1 and T2. However, the present disclosure is not limited thereto, and one pixel PXL may include one transistor and one capacitor, or include three or more transistors and two or more capacitors. For example, one pixel PXL may include seven transistors, the light emitting device OLED, and the capacitor Cst.

Figure 21:
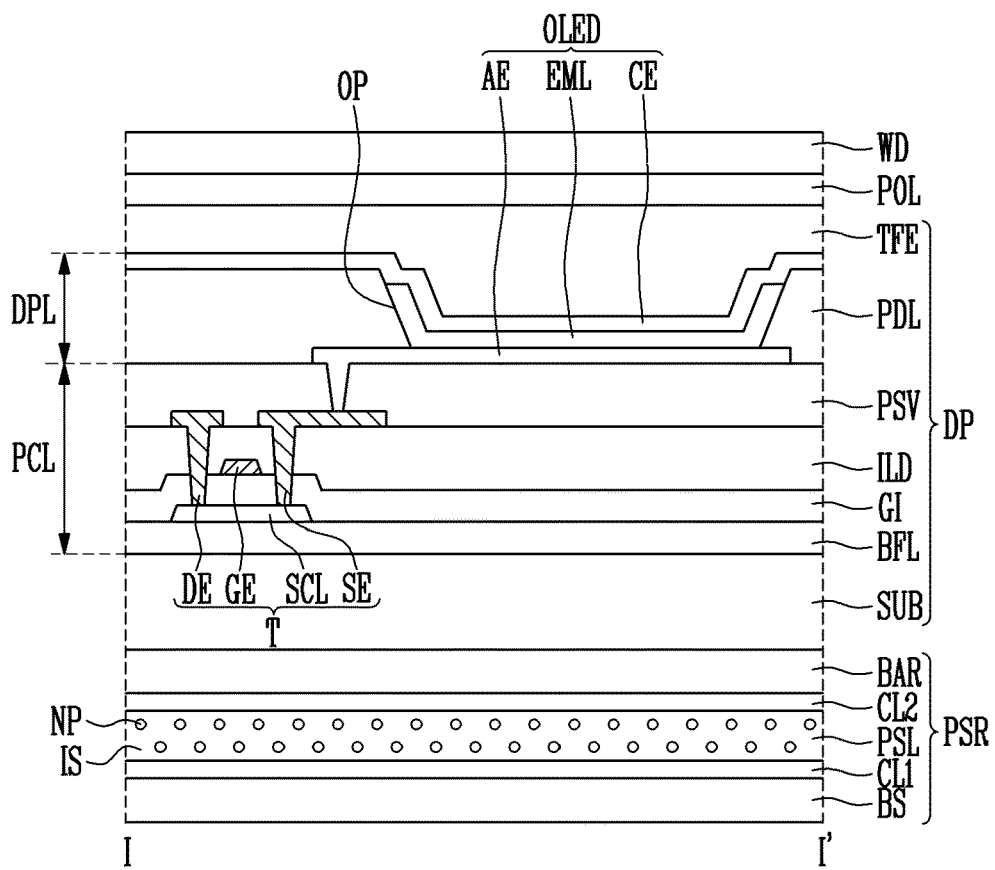
FIG. 21 is a sectional view taken along line I-I' of FIG. 18.

FIG. 21 is a sectional view taken along line I-I' of FIG. 18.

Referring to FIGS. 18 and 21, the display device according to the embodiment of the present disclosure may include a pressure sensor PSR, a display panel DP, and a window WD.

The display panel DP may include a substrate SUB, a pixel circuit unit PCL, a display element layer DPL, and a thin film encapsulation layer TFE.

The substrate SUB may be made of a material having flexibility to be bendable or foldable, and have a single- or multi-layered structure.

The pixel circuit unit PCL may include a buffer layer BFL disposed on the substrate SUB, and a transistor T disposed on the buffer layer BFL.

The buffer layer BFL may prevent an impurity from being diffused into the transistor T. The buffer layer BFL may be provided in a single layer, but be provided in a multi-layer structure including at least two layers. When the buffer layer BFL is provided in the multi-layer structure, the layers may be formed of the same material or be formed of different materials. The buffer layer BFL may be omitted according to the material and process conditions of the substrate SUB.

The transistor T may be a driving transistor electrically connected to a light emitting device OLED of the display element layer DPL to drive the light emitting device OLED. The transistor T may include a semiconductor layer SCL, a gate electrode GE, a source electrode SE, and a drain electrode DE.

The semiconductor layer SCL may be disposed on the buffer layer BFL. The semiconductor layer SCL may include a source region and a drain region, which are in contact with the source electrode SE and the drain electrode DE, respectively. A region between the source region and the drain region may be a channel region. The semiconductor layer SCL may be a semiconductor pattern made of poly-silicon, amorphous silicon, oxide semiconductor, etc. The channel region is a semiconductor pattern undoped with an impurity, and may be an intrinsic semiconductor. The source region and the drain region are semiconductor patterns dope with the impurity. The impurity may include impurities such as an n-type impurity, a p-type impurity, and other metals.

The gate electrode GE may be provided on the semiconductor layer SCL with a gate insulating layer GI interposed therebetween.

The source electrode SE and the drain electrode DE may be in contact with the source region and the drain region of the semiconductor layer SCL through contact holes passing through an interlayer insulating layer ILD and the gate insulating layer GI, respectively.

A protective layer PSV may be provided over the transistor T.

The display element layer DPL may include the light emitting device OLED provided on the protective layer PSV. The light emitting device OLED may include first and second electrodes AE and CE, and an emitting layer EML provided between the two electrodes AE and CE. Here, any one of the first and second electrodes AE and CE may be an anode electrode, and the other of the first and second electrodes AE and CE may be a cathode electrode. For example, the first electrode AE may be an anode electrode and the second electrode CE may be a cathode electrode. When the light emitting device OLED is a top-emission type organic light emitting device, the first electrode AE may be a reflective electrode, and the second electrode CE may be a transmissive electrode. In an embodiment of the present disclosure, a case where the light emitting device OLED is a top-emission type organic light emitting device, and the first electrode AE is an anode electrode is described as an example.

The first electrode AE may be connected to the source electrode SE of the transistor T through a contact hole passing through the protective layer PSV. The first electrode AE may include a reflective layer (not shown) capable of reflecting light and a transparent conductive layer (not shown) disposed on the top or bottom of the reflective layer. At least one of the transparent conductive layer and the reflective layer may be connected to the source electrode SE.

The display element layer DPL may further include a pixel defining layer PDL having an opening OP that allows a portion of the first electrode AE, e.g., a top surface of the first electrode AE to be exposed therethrough.

The pixel defining layer PDL may include an organic insulating material. For example, the pixel defining layer PDL may include at least one of polystyrene, polymethylmethacrylate (PMMA), polyacrylonitrile (PAN), polyamide (PA), polyimide (PI), polyarylether (PAE), heterocyclic polymer, parylene, epoxy, benzocyclobutene (BCB), siloxane based resin, and silane based resin.

The emitting layer EML may be provided on the exposed surface of the first electrode AE.

The emitting layer EML may include a low-molecular or high-molecular material. In an embodiment of the present disclosure, the low-molecular material may include copper phthalocyanine (CuPc), N,N'-Di(naphthalene-1-yl)-N,N'-diphenyl-benzidine (NPB), tris-8-hydroxyquinoline aluminum (Alq3), and the like. The high-molecular material may include poly(3,4-ethylenedioxythiophene) (PEDOT)-, poly(phenylene-vinylene) (PPV)-, poly(fluorine)-based materials.

The emitting layer EML may be provided as a single layer, but may be provided as a multi-layer structure including various functions. When the emitting layer EML is provided as a multi-layer structure, the emitting layer EML may have a structure in which a hole injection layer, a hole transport layer, an emission layer, an electron transport layer, an electron injection layer, and the like are stacked in a single or complex structure. The present disclosure is not necessarily limited thereto, and the emitting layer EML may have various structures. In addition, at least a portion of the emitting layer EML may be integrally formed throughout a plurality of first electrodes AE, or be individually provided to correspond to each of the plurality of first electrodes AE. The color of light generated in the emitting layer EML may be one of red, green, blue, and white, but the present disclosure is not limited thereto. For example, the color of light generated in a light generation layer of the emitting layer EML may be one of magenta, cyan, and yellow.

The second electrode CE may be provided on the emitting layer EML. The second electrode CE may be a semi-transmissive reflective layer. For example, the second electrode CE may be a thin metal layer having a thickness, through which light emitted through the emitting layer EML can be transmitted. The second electrode CE may transmit a portion of the light emitted from the emitting layer EML therethrough, and may reflect the rest of the light emitted from the emitting layer EML.

The thin film encapsulation layer TFE may be provided over the light emitting device OLED. The thin film encapsulation layer TFE may prevent external moisture and oxygen from penetrating into the light emitting device OLED.

The thin film encapsulation layer TFE may be provided in a single layer, but be provided in a multi-layer structure. The thin film encapsulation layer TFE may include a plurality of insulating layers that cover the light emitting device OLED. Specifically, the thin film encapsulation layer TFE may include a plurality of inorganic layers and a plurality of organic layers. For example, the thin film encapsulation layer TFE may have a structure in which the inorganic layers and the organic layers are alternately stacked. Also, in some cases, the thin film encapsulation layer TFE may be an encapsulating substrate that is disposed over the light emitting device OLED and is joined together with the substrate SUB through a sealant.

The window WD may have a shape corresponding to the display panel DP. Also, the window WD may have a plate shape including both surfaces. The window WD may include a material that enables light to be transmitted therethrough. For example, the window WD may be made of a transparent polymer resin or the like, having flexibility. The window WD may prevent the display panel DP from being damaged by an external impact.

A polarizing film POL may be provided between the display panel DP and the window WD. The polarizing film POL may prevent external light from being reflected from the display panel DP. For example, the polarizing film POL may include a linear polarizer and a retardation layer disposed on the linear polarizer.

In an embodiment of the present disclosure, the pressure sensor PSR may be provided on either one of THE surfaces of the display panel DP. For example, the pressure sensor PSR may be provided on a surface of the display panel that is opposite to the surface being in the light emitting direction of the display panel.

In an embodiment of the present disclosure, the pressure sensor PSR may include a base substrate BS, a first conductive layer CL1, a pressure sensitive material layer PSL, a second conductive layer CL2, and a barrier layer BAR.

The base substrate BS may be made of a material having flexibility to be bendable or foldable, and have a single- or multi-layered structure. The base substrate BS may include an embossed pattern (see EBP of FIG. 2).

The first conductive layer CL1 may be provided on the base substrate BS. The first conductive layer CL1 may have a shape in which its surface is curved by the embossed pattern EBP of the base substrate BS. The second conductive layer CL2 may be provided on one surface of the base substrate BS, e.g., a surface facing the first conductive layer CL1.

The pressure sensitive material layer PSL may include a dielectric IS that is a piezoelectric material from which an electric field is generated by a mechanical deformation and nanoparticles NP dispersed in the dielectric IS. In an embodiment of the present disclosure, the dielectric IS may include ferroelectric P(VDF-TrFE) having a positive (+) pyroelectricity, and the nanoparticle NP may include a barium titanate ($BaTiO_3$) nanoparticle, a lithium titanate ($BaTiO_3$) nanoparticle, a lead zirconate titanate (PZT) nanoparticle, a lead titanate ($PbTiO_3$) nanoparticle, and a $Pb_5Ge_3O_{11}$ nanoparticle, which have a negative (−) pyroelectricity. In an embodiment of the present disclosure, the nanoparticle NP may include the barium titanate ($BaTiO_3$) nanoparticle.

Since the pressure sensitive material layer PSL is provided on the first conductive layer CL1 having a shape in which its surface is curved, the pressure sensitive material layer PSL may have a curved shape corresponding to the surface of the first conductive layer CL1.

The barrier layer BAR may cover an exposed surface of the second conductive layer CL2 to protect the second conductive layer CL2.

If a strain is applied to the pressure sensor PSR as a touch applied to the display panel, such as when a user input is being provided, an electrical characteristic of the pressure sensitive material layer PSL corresponding to the region to which the strain is applied is changed. As a change in electrical characteristic is sensed, the display device according to the embodiment of the present disclosure can sense the pressure of the touch of the user and also sense the position of the touch of the user.

The display device according to the embodiment of the present disclosure can be employed in various electronic devices. For example, the display device is applicable to televisions, notebook computers, cellular phones, smart phones, smart pads, PMPs, PDAs, navigations, various wearable devices such as smart watches, and the like.

According to the present disclosure, it is possible to provide a pressure sensor, a manufacturing method thereof, and a display device having the same.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A pressure sensor comprising:
a base substrate including an embossed pattern;
a first conductive layer disposed on the base substrate;
a pressure sensitive material layer disposed on the first conductive layer such that its electrical characteristic is varied corresponding to a strain applied thereto, the pressure sensitive material layer including a dielectric and nanoparticles dispersed in the dielectric; and
a second conductive layer disposed on the pressure sensitive material layer,
wherein the dielectric and the nanoparticle include materials having pyroelectricities of polarities opposite to each other,
wherein the pressure sensitive material layer is formed by depositing the pressure sensitive material layer on the substrate while the substrate is stretched, and
wherein the first conductive layer has a curved surface corresponding to the embossed pattern.

2. The pressure sensor of claim 1, wherein the dielectric includes a ferroelectric piezoelectric material having a positive (+) pyroelectricity, and the nanoparticle includes one of a barium titanate ($BaTiO_3$) nanoparticle, a lithium titanate ($BaTiO_3$) nanoparticle, a lead zirconate titanate (PZT) nanoparticle, a lead titanate ($PbTiO_3$) nanoparticle, and a $Pb_5Ge_3O_{11}$ nanoparticle, which has a negative (−) pyroelectricity.

3. The pressure sensor of claim 1, wherein, in the pressure sensitive material layer, the nanoparticles have a concentration of about 30 wt % to 40 wt %.

4. The pressure sensor of claim 1, wherein the embossed pattern includes:
a plurality of protrusion parts protruding from a surface of the base substrate on which the first conductive layer is formed; and
a valley provided between adjacent protrusion parts.

5. The pressure sensor of claim 4, further comprising a plurality of dummy patterns provided at the peak of the protrusion part.

* * * * *